United States Patent
Yu et al.

(10) Patent No.: US 9,769,831 B2
(45) Date of Patent: Sep. 19, 2017

(54) RANDOM ACCESS METHOD, BASE STATION AND TERMINAL

(71) Applicant: Huawei Technologies Co., Ltd., Shenzhen (CN)

(72) Inventors: Zheng Yu, Beijing (CN); Fang Nan, Beijing (CN); Ningbo Zhang, Shenzhen (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 125 days.

(21) Appl. No.: 14/618,330

(22) Filed: Feb. 10, 2015

(65) Prior Publication Data
US 2015/0156760 A1 Jun. 4, 2015

Related U.S. Application Data

(63) Continuation of application No. PCT/CN2012/079972, filed on Aug. 10, 2012.

(51) Int. Cl.
| | |
|---|---|
| *H04W 74/04* | (2009.01) |
| *H04W 72/04* | (2009.01) |
| *H04W 74/08* | (2009.01) |
| *H04W 4/00* | (2009.01) |

(52) U.S. Cl.
CPC ......... *H04W 72/048* (2013.01); *H04W 4/005* (2013.01); *H04W 72/042* (2013.01); *H04W 72/0446* (2013.01); *H04W 72/0453* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 8,929,306 B2* | 1/2015 | Lee | H04W 74/002 |
| | | | 370/329 |
| 2011/0170515 A1* | 7/2011 | Kim | H04W 72/042 |
| | | | 370/330 |

(Continued)

FOREIGN PATENT DOCUMENTS

| | | |
|---|---|---|
| CN | 101801096 A | 8/2010 |
| CN | 101977401 A | 2/2011 |

(Continued)

OTHER PUBLICATIONS

"3rd Generation Partnership Project; Technical Specification Group Radio Access Network; Study on Provision of Low-Cost MTC UEs Based on LTE; (Release 11)," 3GPP TR 36.888 V2.0.0, Jun. 2012, 43 pages.

(Continued)

*Primary Examiner* — Ayaz Sheikh
*Assistant Examiner* — Faiyazkhan Ghafoerkhan
(74) *Attorney, Agent, or Firm* — Slater Matsil, LLP

(57) ABSTRACT

A random access method, a base station and a terminal are disclosed. The method includes: receiving, by a base station, a preamble sequence that is sent by a terminal during random access; identifying a type of the terminal according to the preamble sequence; and sending, according to the type of the terminal, a message of a random access procedure to the terminal on processing bandwidth supported by the terminal.

10 Claims, 4 Drawing Sheets

(56) References Cited

U.S. PATENT DOCUMENTS

| | | | | |
|---|---|---|---|---|
| 2011/0274040 | A1* | 11/2011 | Pani | H04W 4/005 370/328 |
| 2011/0292893 | A1* | 12/2011 | Lee | H04W 74/002 370/329 |
| 2012/0077507 | A1* | 3/2012 | Lee | H04W 74/006 455/450 |
| 2012/0082106 | A1* | 4/2012 | Wang | H04W 74/0866 370/329 |
| 2012/0115518 | A1* | 5/2012 | Zeira | H04W 8/005 455/500 |
| 2012/0163311 | A1* | 6/2012 | Park | H04W 72/1294 370/329 |
| 2012/0165058 | A1* | 6/2012 | Hwang | H04W 74/006 455/509 |
| 2012/0236803 | A1* | 9/2012 | Vujcic | H04W 72/048 370/329 |
| 2013/0021997 | A1* | 1/2013 | Lee | H04W 74/0841 370/329 |
| 2013/0040597 | A1* | 2/2013 | Jang | H04W 48/02 455/404.1 |
| 2013/0182680 | A1* | 7/2013 | Choi | H04W 28/20 370/331 |
| 2013/0343323 | A1* | 12/2013 | Kang | H04W 72/04 370/329 |
| 2014/0023051 | A1* | 1/2014 | Chen | H04L 1/1887 370/336 |
| 2014/0071930 | A1* | 3/2014 | Lee | H04W 74/0833 370/329 |
| 2014/0079011 | A1* | 3/2014 | Wiberg | H04W 74/006 370/329 |
| 2014/0112286 | A1* | 4/2014 | Ahn | H04W 74/002 370/329 |
| 2014/0233528 | A1* | 8/2014 | Webb | H04W 72/04 370/330 |
| 2015/0103761 | A1* | 4/2015 | Chen | H04W 74/0833 370/329 |
| 2015/0156760 | A1* | 6/2015 | Yu | H04W 4/005 370/330 |
| 2015/0282210 | A1* | 10/2015 | Li | H04W 74/004 455/436 |
| 2015/0326995 | A1* | 11/2015 | Li | H04W 74/08 370/329 |

FOREIGN PATENT DOCUMENTS

| | | | | |
|---|---|---|---|---|
| CN | 101998646 A | | 3/2011 | |
| CN | 102291822 A | | 12/2011 | |
| GB | WO 2013110331 A1 * | | 8/2013 | H04L 5/0094 |
| WO | 2010016726 A2 | | 2/2010 | |
| WO | 2012104635 A1 | | 8/2012 | |

OTHER PUBLICATIONS

"3rd Generation Partnership Project; Technical Specification Group Radio Access Network; Evolved Universal Terrestrial Radio Access (E-UTRA); Physical Channels and Modulation (Release 10)," 3GPP TS 36.211 V10.5.0, Jun. 2012, 101 pages.

"3rd Generation Partnership Project; Technical Specification Group Radio Access Network; Evolved Universal Terrestrial Radio Access (E-UTRA); Medium Access Control (MAC) Protocol Specification (Release 10)," 3GPP TS 36.321 V10.5.0, Mar. 2012, 54 pages.

"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331 V11.0.0, Jun. 2012, 302 pages.

Huawei et al.: "Bandwidth Reduction for Low Cost MTC UE and Text Proposal," 3GPP TSG RAN WG1#68, R1-120051, Feb. 6-10, 2012, pp. 1-10, Dresden, Germany.

* cited by examiner

RANDOM ACCESS METHOD, BASE STATION AND TERMINAL

This application is a continuation of International Application No. PCT/CN2012/079972, filed on Aug. 10, 2012, which is hereby incorporated by reference in its entirety.

TECHNICAL FIELD

The present invention relates to the field of communications technologies, and in particular, to a random access method, a base station and a terminal.

BACKGROUND

The Internet of things refers to a network that obtains information of a physical world by deploying various devices having certain perception, calculation, execution and communication capabilities, and implements information transmission, coordination and processing through the network, thereby implementing interconnection between a person and a thing, or between things. The standardization organization 3rd generation partnership project (3GPP) proposes bearing of application of an Internet of things by means of machine to machine (M2M). With large-scale deployment of a long term evolution (LTE) network, an M2M application is generally implemented based on the LTE network, and the maximal system bandwidth which can be supported by the LTE is 20 M. An ordinary terminal is capable of supporting reception/transmission of a service on the full frequency band of the LTE; while in increasingly developed M2M technologies, in order to reduce the terminal cost, machine type communication (MTC) terminals of low cost are required, and these MTC terminals are small-bandwidth low-end terminals (Low cost UE), such as terminals supporting bandwidth of 1.4 M.

When a terminal needs to establish a connection with a network, a random access (RA) procedure needs to be completed. In an existing LTE system, a random access procedure of an MTC terminal is the same as that of an ordinary terminal, and includes a competitive random access procedure and a non-competitive random access procedure. The competitive random access is formed of the following four steps: a first step, transmission of a preamble: a terminal selects a random access sequence from a random access sequence set randomly, and sends a preamble sequence to a base station through a physical random access channel (PRACH) on a random access resource designated in advance by the base station; a second step, random access response (RAR): the terminal receives an RAR delivered from the base station on a physical downlink shared channel (PDSCH), and determines, according to whether a response corresponding to the preamble sequence sent by the terminal is received, whether the random access is successful, where terminals using the same PRACH resource receive the RAR on a same PDSCH; a third step, sending of a layer 2/layer 3 message: the terminal transfers a random access procedure message to the base station on a physical uplink shared channel (PUSCH) designated in the RAR by using a temporary cell radio network temporary identifier (C-RNTI) included in the RAR, where the random access procedure message includes an identifier of a UE in this cell, and the identifier is used for competition solution; and a fourth step, competition solution: the terminal receives a competition solution message sent from the base station, and completes the random access procedure. The non-competitive random access procedure includes the first two steps of the foregoing competitive random access procedure.

In the existing LTE system, because an MTC terminal and an ordinary terminal adopt the same random access procedure, when a quantity of MTC terminals is large, competition between MTC terminals and ordinary terminals in a random procedure is aggravated, the performance and the capacity of a PRACH are affected, a success probability of random access is reduced, and the random access procedure of the ordinary terminal is influenced. Additionally, if an MTC terminal can only process data in a small bandwidth range, when a base station side delivers a random access response message and a competition solution message to the MTC terminal and the ordinary terminal, in order to ensure that the MTC terminal can perform normal reception, the messages in these two steps can only be delivered in the small bandwidth range, thereby decreasing the reception performance of the ordinary terminal, and affecting the random access quality of the ordinary terminal.

SUMMARY

Embodiments of the present invention provide a random access method, a base station and a terminal, so as to solve a problem in the prior art that an MTC terminal and an ordinary terminal adopt a same random access manner, which influences the random access quality of the ordinary terminal.

In order to solve the foregoing technical problem, the embodiments of the present invention disclose the following technical solutions.

According to a first aspect, a random access method is provided and includes: receiving, by a base station, a preamble sequence that is sent by a terminal during random access; identifying a type of the terminal according to the preamble sequence; and sending, according to the type of the terminal, a message of a random access procedure to the terminal on processing bandwidth supported by the terminal.

With reference to the first aspect, in a first possible implementation manner, the identifying a type of the terminal according to the preamble sequence includes: identifying the type of the terminal according to a time domain resource for sending the preamble sequence; and/or identifying the type of the terminal according to a frequency domain resource for sending the preamble sequence; and/or identifying the type of the terminal according to a type of the preamble sequence.

With reference to the first aspect and the first possible implementation manner, in a second possible implementation manner, the message in the random access procedure includes: a random access response message and a competition solution message; and the sending, according to the type of the terminal, a message of a random access procedure to the terminal on processing bandwidth supported by the terminal includes: sending, when the terminal is an MTC terminal, a random access response message and a competition solution message to the terminal on first bandwidth supported by the MTC terminal, and sending, when the terminal is an ordinary terminal, a random access response message and a competition solution message to the terminal on second bandwidth supported by the ordinary terminal.

According to a second aspect, another random access method is provided and includes: sending, by a terminal, a preamble sequence to a base station according to a type of the terminal during random access; and receiving a message of a random access procedure that the base station, after identifying the type of the terminal according to the preamble sequence, sends to the terminal on processing bandwidth supported by the terminal.

With reference to the second aspect, in a first possible implementation manner, the sending a preamble sequence to a base station according to a type of the terminal includes: sending a preamble sequence to the base station on a time domain resource corresponding to the type of the terminal; and/or sending a preamble sequence to the base station on a frequency domain resource corresponding to the type of the terminal; and/or sending a preamble sequence corresponding to the type of the terminal to the base station.

According to a third aspect, a base station is provided and includes: a receiving unit, configured to receive a preamble sequence that is sent by a terminal during random access; an identifying unit, configured to identify a type of the terminal according to the preamble sequence received by the receiving unit; and a sending unit, configured to send, according to the type of the terminal identified by the identifying unit, a message of a random access procedure to the terminal on processing bandwidth supported by the terminal.

With reference to the third aspect, in a first possible implementation manner, the identifying unit includes at least one of the following units: a first identifying subunit, configured to identify the type of the terminal according to a time domain resource for sending the preamble sequence; a second identifying subunit, configured to identify the type of the terminal according to a frequency domain resource for sending the preamble sequence; and a third identifying subunit, configured to identify the type of the terminal according to a type of the preamble sequence.

With reference to the third aspect and the first possible implementation manner, in a second possible implementation manner, the message in the random access procedure includes: a random access response message and a competition solution message; and the sending unit is specifically configured to send, when the terminal is an MTC terminal, a random access response message and a competition solution message to the terminal on first bandwidth supported by the MTC terminal, and send, when the terminal is an ordinary terminal, a random access response message and a competition solution message to the terminal on second bandwidth supported by the ordinary terminal, where the first bandwidth is less than the second bandwidth.

According to a fourth aspect, another base station is provided and includes: a receiver, configured to receive a preamble sequence that is sent by a terminal during random access; a processor, configured to identify a type of the terminal according to the preamble sequence; and a transmitter, configured to send, according to the type of the terminal, a message of a random access procedure to the terminal on processing bandwidth supported by the terminal.

With reference to the fourth aspect, in a first possible implementation manner, the processor is specifically configured to identify the type of the terminal according to a time domain resource for sending the preamble sequence, and/or identify the type of the terminal according to a frequency domain resource for sending the preamble sequence, and/or identify the type of the terminal according to a type of the preamble sequence.

With reference to the fourth aspect and the first possible implementation manner, in a second possible implementation manner, the transmitter is specifically configured to send, when the terminal is an MTC terminal, a random access response message and a competition solution message to the terminal on first bandwidth supported by the MTC terminal, and send, when the terminal is an ordinary terminal, a random access response message and a competition solution message to the terminal on second bandwidth supported by the ordinary terminal, where the first bandwidth is less than the second bandwidth.

According to a fifth aspect, a terminal is provided and includes: a sending unit, configured to send a preamble sequence to a base station according to a type of the terminal during random access; and a receiving unit, configured to receive, after the base station identifies the type of the terminal according to the preamble sequence sent by the sending unit, a message of a random access procedure sent to the terminal on processing bandwidth supported by the terminal.

With reference to the fifth aspect, in a first possible implementation manner, the sending unit includes at least one of the following units: a first sending subunit, configured to send a preamble sequence to the base station on a time domain resource corresponding to the type of the terminal; a second sending subunit, configured to send a preamble sequence to the base station on a frequency domain resource corresponding to the type of the terminal; and a third sending subunit, configured to send a preamble sequence corresponding to the type of the terminal to the base station.

According to a sixth aspect, another terminal is provided and includes: a transmitter, configured to send a preamble sequence to a base station according to a type of the terminal during random access; and a receiver, configured to receive a message of a random access procedure that the base station, after identifying the type of the terminal according to the preamble sequence, sends to the terminal on processing bandwidth supported by the terminal.

With reference to the sixth aspect, in a first possible implementation manner, the transmitter is specifically configured to send a preamble sequence to the base station on a time domain resource corresponding to the type of the terminal, and/or send a preamble sequence to the base station on a frequency domain resource corresponding to the type of the terminal, and/or send a preamble sequence corresponding to the type of the terminal to the base station.

In the embodiments of the present invention, a base station receives a preamble sequence that is sent by a terminal during random access, identifies a type of the terminal according to the preamble sequence, and sends, according to the type of the terminal, a message of a random access procedure to the terminal on processing bandwidth supported by the terminal. In the embodiments of the present invention, an MTC terminal and an ordinary terminal can be distinguished in a random access procedure, influence of the MTC terminal on the ordinary terminal in the random access procedure is reduced, collision between the MTC terminal and the ordinary terminal which send a preamble sequence on a same time frequency resource is avoided, competition between the MTC terminal and the ordinary terminal in the random access procedure is alleviated, and the random access quality of the ordinary terminal is improved. Additionally, after the terminal sends a preamble sequence to the base station, the base station can know the type of the terminal, so for an MTC terminal, a message which can be processed by the MCT terminal can be sent on small bandwidth, and for an ordinary terminal, a message which the ordinary terminal can process can be sent on a full frequency band, thereby ensuring that the reception performance of the ordinary terminal is not affected by the MTC terminal.

BRIEF DESCRIPTION OF THE DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following embodiments of the present invention provide a random access method, a base station and a terminal.

In order to make persons in the technical field better understand the technical solutions in the embodiments of the present invention, and make the foregoing objectives, features, and advantages of the embodiments of the present invention easier to understand, the following further describes the technical solutions in the embodiments of the present invention in detail with reference to the accompanying drawings.

The embodiments of the present invention may be applied to an LTE system, and bandwidth resources of the LTE system are divided into several symbols on a time domain, and divided into several sub-carriers on a frequency domain. An LTE system frame includes 10 subframes, a subframe includes two time slots, a subframe is 1 ms in length, and includes 14 symbols for a general cyclic prefix, and the time length of a subframe is one transmission time interval (TTI). A size of a resource block (RB) is defined to be 12 sub-carriers on a frequency domain, and to be the length of a time slot on a time domain, that is, seven symbols are included for a general cyclic prefix. The terminal in the embodiments of the present invention can also be referred to as a user equipment (UE).

Figure 1:
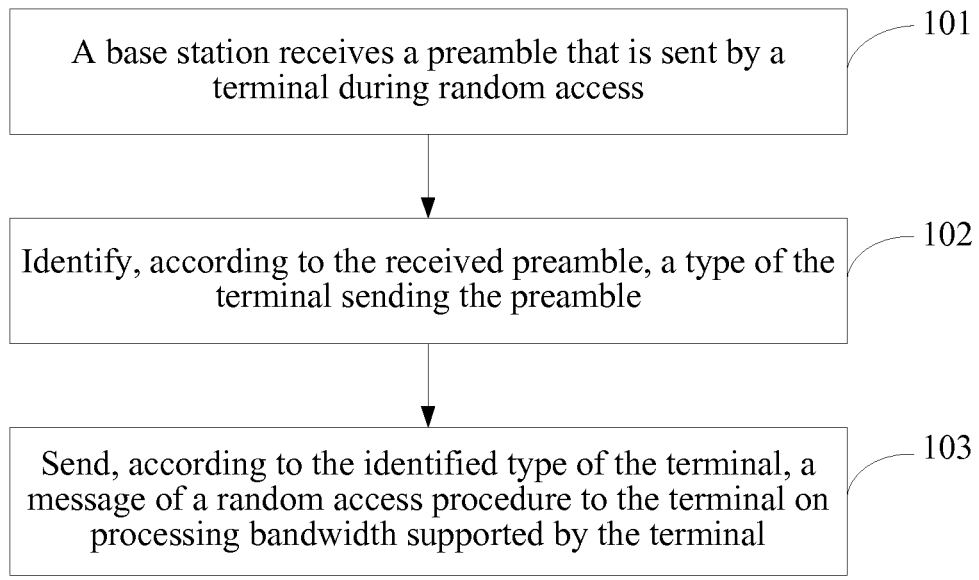
FIG. 1 is a flow chart of an embodiment of a random access method according to the present invention.

Referring to FIG. 1, FIG. 1 is an embodiment of a random access method according to the present invention, and the embodiment describes a random access procedure of a terminal from a base station side.

Step 101: A base station receives a preamble sequence that is sent by a terminal during random access.

The preamble sequence sent by the terminal to the base station is borne through a physical random access channel (PRACH), and the preamble sequence is formed of a sequence duration ($T_{SEQ}$) and a cyclic prefix duration ($T_{CP}$). The formation of the preamble sequence borne by the PRACH is classified into five formats, which are shown in the following Table 1.

TABLE 1

| Sequence format | $T_{CP}$ | $T_{SEQ}$ |
| --- | --- | --- |
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 | $448 \cdot T_s$ | $4096 \cdot T_s$ |

In Table 1, $T_s$ indicates a time unit, generally $T_s=1/(15000 \times 2048)$s, Table 1 is equivalent to that the time domain length of a PRACH is specified, while on a frequency domain, the PRACH occupies 1.08 MHz, namely, a frequency domain resource of 6 RBs. A frequency division duplex (Frequency Division Duplex, FDD) system can use format 0 to format 3 of the preamble sequence in Table 1, and a time division duplex (TDD) system can use format 0 to format 4 of the preamble sequence in Table 1, where format 4 is only used for preamble sequence configuration of a special subframe in a TDD system.

Step 102: Identify, according to the received preamble sequence, the type of the terminal sending the preamble sequence.

Optionally, the base station may identify the type of the terminal according to a time domain resource for sending the preamble sequence, that is, the ordinary terminal and the MTC terminal can send the preamble sequence through different time domain resources; and/or the base station may also identify the type of the terminal according to a frequency domain resource for sending the preamble sequence, that is, the ordinary terminal and the MTC terminal can send the preamble sequence through different frequency domain resources; and/or the base station may also identify the type of the terminal according to the type of the preamble sequence, that is, preamble sequences sent by the ordinary terminal and the MTC terminal are different.

When the type of the terminal is identified according to a time domain resource for sending the preamble sequence, the following three manners can be specifically adopted.

First manner: preconfiguring a first random access resource configuration table, where the first random access resource configuration table includes an indication relationship between a random access configuration index and a first time domain resource as well as a second time domain resource; and configuring a first time domain resource and a second time domain resource different from the first time domain resource for an ordinary terminal and an MTC terminal, respectively, by using a same random access configuration index; notifying the terminal of a parameter for performing the random access through RRC broadcast or unicast signaling, where the RRC broadcast or unicast signaling includes a random access configuration index configured for the terminal; and determining, when the preamble sequence sent by the terminal is detected on the first time domain resource indicated by the one random access configuration index, that the terminal is an ordinary terminal, and determining, when the preamble sequence sent by the terminal is detected on the second time domain resource indicated by the one random access configuration index, that the terminal is an MTC terminal.

Second manner: preconfiguring an ordinary terminal resource configuration table and an MTC terminal resource configuration table, where the ordinary terminal resource configuration table includes an indication relationship between a first random access configuration index and a first time domain resource, and the MTC terminal resource configuration table includes an indication relationship between a second random access configuration index and a second time domain resource; notifying the terminal of a parameter for performing the random access through RRC broadcast or unicast signaling, where the RRC broadcast or unicast signaling includes one first random access configuration index configured for an ordinary terminal, and one second random access configuration index configured for an MTC terminal; and determining, when the preamble sequence sent by the terminal is detected on the first time domain resource indicated by the one first random access configuration index, that the terminal is an ordinary terminal, and determining, when the preamble sequence sent by the terminal is detected on the second time domain resource indicated by the one second random access configuration index, that the terminal is an MTC terminal.

Third manner: preconfiguring a second resource configuration table, where the second resource configuration table includes an indication relationship between a random access configuration index of the terminal and a time domain resource; notifying the terminal of a parameter for performing the random access through RRC broadcast or unicast signaling, where the RRC broadcast or unicast signaling includes a random access configuration index configured for the terminal; and determining, when the preamble sequence sent by the terminal is detected on the time domain resource indicated by the one random access configuration index, that the terminal is an ordinary terminal, and determining, when the preamble sequence sent by the terminal is detected on a time domain resource obtained after the time domain resource indicated by the one random access configuration index is offset according to a designated time domain resource offset value, that the terminal is an MTC terminal, where the designated time domain resource offset value is a time domain resource offset value notified through the RRC broadcast or unicast signaling, or a preconfigured time domain resource offset value.

When the type of the terminal is identified according to a frequency domain resource for sending the preamble sequence, the following two manners can be adopted.

First manner: notifying the terminal of a parameter for performing the random access through RRC broadcast or unicast signaling, where the RRC broadcast or unicast signaling includes indication information of a first frequency domain resource configured for an ordinary terminal, and indication information of a second frequency domain resource configured for an MTC terminal; and determining, when that the terminal sends a preamble sequence on the first frequency domain resource is detected, that the terminal is an ordinary terminal, and determining, when that the terminal sends a preamble sequence on the second frequency domain resource is detected, that the terminal is an MTC terminal, where the first frequency domain resource and the second frequency domain resource are different frequency domain resources, and the notifying the terminal of a parameter for performing the random access through RRC broadcast or unicast signaling may include: notifying, in the RRC broadcast or unicast signaling, a first physical random access channel frequency offset prach-Frequencyoffset configured for an ordinary terminal and used as indication information of the first frequency domain resource, and a second physical random access channel frequency offset prach-Frequencyoffset configured for an MTC terminal and used as indication information of the second frequency domain resource; and/or notifying, in the RRC broadcast or unicast signaling, a first random access configuration index configured for an ordinary terminal and used as indication information of the first frequency domain resource, and a second random access configuration index configured for an MTC terminal and used as indication information of the second frequency domain resource; and/or notifying, in the RRC broadcast or unicast signaling, a same random access configuration index configured for an ordinary terminal and an MTC terminal and used as indication information of the first frequency domain resource and indication information of the second frequency domain resource, where the same random access configuration index is used to indicate the first frequency domain resource and the second frequency domain resource for the ordinary terminal and the MTC terminal, respectively.

Second manner: notifying the terminal of a parameter for performing the random access through RRC broadcast or unicast signaling, where the RRC broadcast or unicast signaling includes indication information of a first frequency domain resource configured for the terminal, and the indication information of the first frequency domain resource includes a physical random access channel frequency offset prach-Frequencyoffset and/or a random access configuration index; and determining, when that the terminal sends a preamble sequence on the first frequency domain resource is detected, that the terminal is an ordinary terminal, and determining, when that a frequency domain resource on which the terminal sends the preamble sequence is a frequency domain resource obtained after the first frequency domain resource is offset according to a designated frequency domain resource offset value is detected, that the terminal is an MTC terminal, where the designated frequency domain resource offset value is a frequency domain resource offset value notified through the RRC broadcast or unicast signaling, or a preconfigured frequency domain resource offset value.

When the type of the terminal is identified according to the type of the preamble sequence, the following manner can be adopted: determining, when a first preamble sequence sent by the terminal is received, that the terminal is an ordinary terminal, and determining, when a second preamble sequence sent by the terminal is received, that the terminal is an MTC terminal, where the first preamble sequence is existing preamble sequences, and the second preamble sequence is several preamble sequences newly defined for the MTC terminal; or, the first preamble sequence is a preamble sequence in the existing preamble sequences except a dedicated sequence, and the second preamble sequence is several preamble sequences into which the dedicated sequence is divided.

Specifically, a manner of generating the newly defined several preamble sequences may include: generating, by adopting a root sequence for generating the 64th preamble sequence in the existing preamble sequences, the newly defined preamble sequences by sequentially increasing a cyclic displacement value of the root sequence; sequentially selecting, when a quantity of the newly defined preamble sequences generated according to the root sequence is less than a preset quantity, root sequences corresponding to logic sequence numbers consecutive with a logic sequence number of the root sequence; and generating the newly defined preamble sequences by performing cyclic displacement on the selected root sequences, until the quantity of the newly defined preamble sequences satisfies the preset quantity; or notifying a logic sequence number of a root sequence of an MTC terminal through RRC broadcast or unicast signaling; generating the newly defined preamble sequences by sequentially increasing a cyclic displacement value of the root sequence of the MTC terminal; sequentially selecting, when a quantity of the newly defined preamble sequences generated according to the root sequence of the MTC terminal is less than a preset quantity, root sequences corresponding to logic sequence numbers consecutive with the logic sequence number of the root sequence of the MTC terminal; and generating the newly defined preamble sequences by performing cyclic displacement on the selected root sequences, until the quantity of the newly defined preamble sequences satisfies the preset quantity; or notifying a logic sequence number of a root sequence of an ordinary terminal through RRC broadcast or unicast signaling; obtaining the root sequence of the MTC terminal according to a designated root sequence offset value and the logic sequence number of the root sequence of the ordinary terminal; sequentially increasing a cyclic displacement value of the root sequence of the MTC terminal to generate the newly defined preamble sequences; sequentially selecting, when a quantity of the newly defined preamble sequences generated according to the root sequence of the MTC terminal is less than a preset quantity, root sequences corresponding to logic sequence numbers consecutive with the logic sequence number of the root sequence of the MTC terminal; and generating the newly defined preamble sequences by performing cyclic displacement on the selected root sequences, until the quantity of the newly defined preamble sequences satisfies the preset quantity, in which, the designated root sequence offset value is a root sequence offset value notified through RRC broadcast or unicast signaling, or preconfigured root sequence offset value, where the newly defined preamble sequences and the existing preamble sequences are different preamble sequences.

Specifically, a division manner in which the second preamble sequence is several preamble sequences into which the dedicated sequence is divided may include: notifying the quantity of sequences, serving as the second preamble sequence, in the dedicated sequence through RRC broadcast or unicast signaling, and obtaining the second preamble sequence according to the sequence quantity and a sequence number of an initial sequence designated as the second preamble sequence, where the sequence number of the designated initial sequence is a sequence number of an initial sequence notified through RRC broadcast or unicast signaling, or a sequence number of a preconfigured initial sequence, or a sequence number of an initial sequence obtained according to the sequence quantity.

Step 103: Send, according to the identified type of the terminal, a message of a random access procedure to the terminal on processing bandwidth supported by the terminal.

Optionally, the message in the random access procedure may include: a random access response message and a competition solution message.

Optionally, when the terminal is an MTC terminal, a random access response message and a competition solution message are sent to the terminal on first bandwidth supported by the MTC terminal, and when the terminal is an ordinary terminal, a random access response message and a competition solution message are sent to the terminal on second bandwidth supported by the ordinary terminal, where the first bandwidth is less than the second bandwidth.

It can be seen from the foregoing embodiment that, the base station can distinguish an MTC terminal and an ordinary terminal in a random access procedure, so influence of the MTC terminal on the ordinary terminal in the random access procedure is reduced, collision between the MTC terminal and the ordinary terminal which send a preamble sequence on a same time frequency resource is avoided, competition between the MTC terminal and the ordinary terminal in the random access procedure is alleviated, and the random access quality of the ordinary terminal is improved. Additionally, after the terminal sends a preamble sequence to the base station, the base station can know the type of the terminal, so for an MTC terminal, a message which the MTC terminal can process can be sent on small bandwidth, and for an ordinary terminal, a message which the ordinary terminal can process can be sent on a full frequency band, thereby ensuring that the reception performance of the ordinary terminal is not affected by the MTC terminal.

Figure 2:
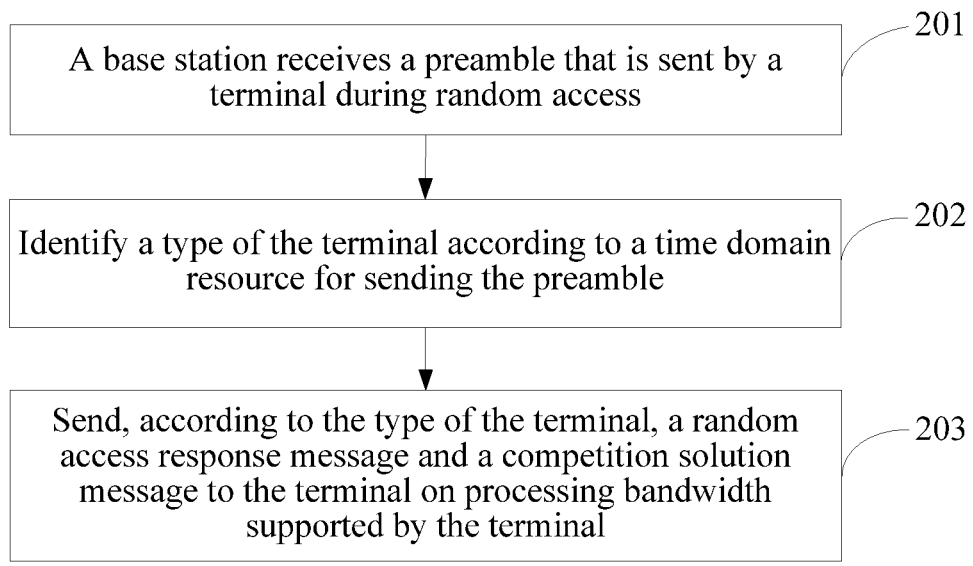
FIG. 2 is a flow chart of another embodiment of a random access method according to the present invention.

Referring to FIG. 2, FIG. 2 is another embodiment of a random access method according to the present invention, and the embodiment shows a random access procedure in which a base station distinguishes types of terminals according to preamble sequences sent by the terminals on different time domain resources.

Step 201: A base station receives a preamble sequence that is sent by a terminal during random access.

The preamble sequence sent by the terminal to the base station is borne through a PRACH, and the preamble sequence is formed of a sequence duration ($T_{SEQ}$) and a cyclic prefix duration ($T_{CP}$). The formation of the preamble sequence borne by the PRACH is classified into five formats, which are shown in the foregoing Table 1. Format 0 to format 3 of the preamble sequence in Table 1 may be used for an FDD system, and format 0 to format 4 of the preamble sequence in Table 1 may be used for a TDD system.

In this embodiment, types of terminals are classified into an ordinary terminal and an MTC terminal, and the ordinary terminal and the MTC terminal send preamble sequences on different time domain resources.

Step 202: Identify a type of the terminal according to a time domain resource for sending the preamble sequence.

The base station distinguishes the types of the terminals through the preamble sequences sent by the ordinary terminal and the MTC terminal on different time domain resources. Optionally, the base station can identify a type of a terminal in three time domain resource configuration manners.

In a first manner, the base station preconfigures a first random access resource configuration table, where the first random access resource configuration table includes an indication relationship between a random access configuration index (prach-ConfigurationIndex) and a first time domain resource as well as a second time domain resource; and configures a first time domain resource and a second time domain resource different from the first time domain resource for an ordinary terminal and an MTC terminal, respectively, by using a same random access configuration index; the base station notifies a parameter for performing the random access for the terminal through RRC broadcast or unicast signaling, where the RRC broadcast or unicast signaling includes a random access configuration index configured for the terminal; the terminal searches for the first random access resource configuration table according to the random access configuration index, obtains a time domain resource corresponding to the type of the terminal, and sends a preamble sequence on the obtained time domain resource; after receiving the preamble sequence sent by the terminal, the base station determines, when the preamble sequence sent by the terminal is detected on the first time domain resource indicated by the one random access configuration index, the terminal is an ordinary terminal, and determines, when the preamble sequence sent by the terminal is detected on the second time domain resource indicated by the one random access configuration index, the terminal is an MTC terminal. In this implementation manner, when notifying the terminal to perform random access, the base station only needs to carry one random access configuration index in RRC signaling, so the format of the RRC signaling can be a format the same as that in the prior art.

For an FDD system, an example of the first random access resource configuration table is shown in the following Table 2, and Table 2 includes an indication relationships for a prach-ConfigurationIndex, a preamble sequence format, a system frame number, a subframe number, where the first time domain resource is determined by the system frame number and the subframe number of the ordinary terminal, and the second time domain resource is determined by the system frame number and the subframe number of the MTC terminal.

TABLE 2

| Prach-Configuration Index | Preamble sequence format | System frame number | Subframe number of MTC terminal | Subframe number of ordinary terminal |
|---|---|---|---|---|
| 0 | 0 | Even | 3 | 1 |
| 1 | 0 | Even | 5 | 4 |
| 2 | 0 | Even | 2 | 7 |
| 3 | 0 | Any | 3 | 1 |
| 4 | 0 | Any | 5 | 4 |
| 5 | 0 | Any | 2 | 7 |
| 6 | 0 | Any | 3, 8 | 1, 6 |
| 7 | 0 | Any | 4, 9 | 2, 7 |
| (omitted) | | | | |

In the foregoing Table 2, part of time domain resource configuration information at the time when the preamble sequence format is 0 is only exemplarily shown, where the MTC terminal and the ordinary terminal can configure different subframes under the same prach-ConfigurationIndex, so as to indicate that PRACH preamble sequences are sent by adopting different time domain resources, Even under the system frame number indicates a system frame number of an even number type, and Any indicates any system frame number.

A TDD system allows a plurality of PRACH frequency domain resources to exist in an uplink subframe or a special subframe, and generally allows a maximum of 6 terminals to send a PRACH preamble sequence simultaneously on an uplink subframe or a special subframe, and to perform frequency division multiplexing on a frequency domain. The parameter prach-ConfigurationIndex configured by upper-layer RRC signaling indicates a relationship between various formats of a PRACH, a PRACH resource density value, and a version index.

The parameter indicated by the prach-ConfigurationIndex and denoting a resource location includes $f_{RA}$, $t_{RA}^{(0)}$, $t_{RA}^{(1)}$, $t_{RA}^{(2)}$, where $f_{RA}$ indicates a sequence number of a frequency resource, and has a maximum of 6 values; $t_{RA}^{(0)}=0, 1, 2$ indicates that a PRACH resource occurs in all system frames ($t_{RA}^{(0)}=0$), a PRACH resource occurs in a system frame of an even number frame number ($t_{RA}^{(0)}=1$), and a PRACH resource occurs in a system frame of an odd number frame number ($t_{RA}^{(0)}=2$), respectively; $t_{RA}^{(1)}=0, 1$ indicates that a PRACH resource is located at the first half of a system frame ($t_{RA}^{(0)}=0$), and a PRACH resource is located at the second half of the system frame ($t_{RA}^{(0)}=1$), respectively; $t_{RA}^{(2)}$ is a starting uplink subframe number of a preamble sequence, which begins to count from 0 between two consecutive downlink-to-uplink conversion points, and when format 4 is adopted, $t_{RA}^{(2)}$ is indicated as (*).

When format 0 to format 3 shown in Table 1 are adopted, the starting point of a frequency domain resource available to a PRACH preamble sequence is obtained through calculation by $f_{RA}$, a physical resource block sequence number ($n_{PRBoffset}^{RA}$) set by a physical random access channel frequency offset parameter (prach-FrequencyOffset) configured by upper-layer RRC signaling, and a quantity of available uplink RBs jointly. When format 4 is adopted, the starting point of a frequency domain resource available to a PRACH preamble sequence is obtained through calculation by $f_{RA}$, the quantity of available uplink RBs, a system frame number of the RBs, a quantity of downlink uplink conversion points and $t_{RA}^{(1)}$ jointly.

When values of $t_{RA}^{(0)}$ and/or $t_{RA}^{(1)}$ and/or $t_{RA}^{(2)}$ of the ordinary terminal and the MTC terminal are different, it indicates that the ordinary terminal and the MTC terminal adopt different time domain resources, and an example of a first random access resource configuration table of the TDD is shown in the following Table 3, where the first time domain resource is determined by values of $t_{RA}^{(0)}$, $t_{RA}^{(1)}$ and $t_{RA}^{(2)}$ in the resource configuration of the ordinary terminal, and the second time domain resource is determined by values of $t_{RA}^{(0)}$, $t_{RA}^{(1)}$ and $t_{RA}^{(2)}$ in the resource configuration of the MTC terminal.

TABLE 3

| Prach-Configuration Index | TDD UL/DL configuration, resource configuration of ordinary terminal | | | | | | | TDD UL/DL configuration, resource configuration of MTC terminal | | | | | | |
|---|---|---|---|---|---|---|---|---|---|---|---|---|---|---|
| | 0 | 1 | 2 | 3 | 4 | 5 | 6 | 0 | 1 | 2 | 3 | 4 | 5 | 6 |
| 0 | (0, 1, 0, 2) | (0, 1, 0, 1) | (0, 1, 0, 0) | (0, 1, 0, 2) | (0, 1, 0, 1) | (0, 1, 0, 0) | (0, 1, 0, 2) | (0, 2, 0, 2) | (0, 2, 0, 1) | (0, 2, 0, 0) | (0, 2, 0, 2) | (0, 2, 0, 1) | (0, 2, 0, 0) | (0, 2, 0, 2) |
| 1 | (0, 2, 0, 2) | (0, 2, 0, 1) | (0, 2, 0, 0) | (0, 2, 0, 2) | (0, 2, 0, 1) | (0, 2, 0, 0) | (0, 2, 0, 2) | (0, 1, 0, 2) | (0, 1, 0, 1) | (0, 1, 0, 0) | (0, 1, 0, 2) | (0, 1, 0, 1) | (0, 1, 0, 0) | (0, 1, 0, 2) |
| 2 | (0, 1, 1, 2) | (0, 1, 1, 1) | (0, 1, 1, 0) | (0, 1, 0, 1) | (0, 1, 0, 0) | N/A | (0, 1, 1, 1) | (0, 2, 1, 2) | (0, 2, 1, 1) | (0, 2, 1, 0) | (0, 2, 0, 1) | (0, 2, 0, 0) | N/A | (0, 2, 1, 1) |
| 3 | (0, 0, 0, 2) | (0, 0, 0, 1) | (0, 0, 0, 0) | (0, 0, 0, 2) | (0, 0, 0, 1) | (0, 0, 0, 0) | (0, 0, 0, 2) | (0, 0, 1, 2) | (0, 0, 1, 1) | (0, 0, 1, 0) | (0, 0, 0, 0) | (0, 0, 0, 0) | (1, 0, 0, 0) | (0, 0, 1, 1) |
| 4 | (0, 0, 1, 2) | (0, 0, 1, 1) | (0, 0, 1, 0) | (0, 0, 0, 1) | (0, 0, 0, 0) | N/A | (0, 0, 1, 1) | (0, 0, 0, 2) | (0, 0, 0, 1) | (0, 0, 0, 0) | (0, 0, 0, 2) | (0, 0, 0, 1) | N/A | (0, 0, 0, 2) |
| 5 | (0, 0, 0, 1) | (0, 0, 0, 0) | N/A | (0, 0, 0, 0) | N/A | N/A | (0, 0, 0, 1) | (0, 0, 1, 1) | (0, 0, 1, 0) | N/A | (0, 0, 0, 1) | N/A | N/A | (0, 0, 1, 1) |
| 6 | (0, 0, 0, 2) (0, 0, 1, 2) | (0, 0, 0, 1) (0, 0, 1, 1) | (0, 0, 0, 0) (0, 0, 1, 0) | (0, 0, 0, 1) (0, 0, 0, 2) | (0, 0, 0, 0) (0, 0, 0, 1) | (0, 0, 0, 0) (1, 0, 0, 0) | (0, 0, 0, 2) (0, 0, 1, 1) | (0, 0, 0, 0) (0, 0, 1, 0) | (0, 0, 0, 0) (0, 0, 1, 0) | (1, 0, 0, 0) (1, 0, 0, 0) | (0, 0, 0, 0) (0, 0, 0, 1) | (1, 0, 0, 0) (1, 0, 0, 1) | (2, 0, 0, 0) (3, 0, 0, 1) | (0, 0, 0, 0) (0, 0, 1, 1) |

TABLE 3-continued

| Prach-Configuration Index | TDD UL/DL configuration, resource configuration of ordinary terminal | | | | | | | TDD UL/DL configuration, resource configuration of MTC terminal | | | | | | |
|---|---|---|---|---|---|---|---|---|---|---|---|---|---|---|
| | 0 | 1 | 2 | 3 | 4 | 5 | 6 | 0 | 1 | 2 | 3 | 4 | 5 | 6 |
| 7 | (0, 0, 0, 1) (0, 0, 1, 1) | (0, 0, 0, 0) (0, 0, 1, 0) | N/A | (0, 0, 0, 0) (0, 0, 0, 2) | N/A | N/A | (0, 0, 0, 1) (0, 0, 1, 0) | (0, 0, 0, 2) (0, 0, 1, 2) | (0, 0, 0, 1) (0, 0, 1, 1) | N/A | (0, 0, 0, 1) (0, 0, 0, 2) | N/A | N/A | (0, 0, 0, 2) (0, 0, 1, 1) |
| 8 | (0, 0, 0, 0) (0, 0, 1, 0) | N/A | N/A | (0, 0, 0, 0) (0, 0, 0, 1) | N/A | N/A | (0, 0, 0, 0) (0, 0, 1, 1) | (0, 0, 0, 1) (0, 0, 1, 1) | N/A | N/A | (0, 0, 0, 0) (0, 0, 0, 2) | N/A | N/A | (0, 0, 0, 1) (0, 0, 1, 0) |
| (omitted) | | | | | | | | | | | | | | |
| 29/39 | (0, 0, 0, 1) (0, 0, 1, 1) (1, 0, 0, 1) (1, 0, 1, 1) (2, 0, 0, 1) (2, 0, 1, 1) | (0, 0, 0, 0) (0, 0, 1, 0) (1, 0, 0, 0) (1, 0, 1, 0) (2, 0, 0, 0) (2, 0, 1, 0) | N/A | (0, 0, 0, 1) (1, 0, 0, 1) (2, 0, 0, 1) (3, 0, 0, 1) (4, 0, 0, 1) (5, 0, 0, 1) | (0, 0, 0, 0) (1, 0, 0, 0) (2, 0, 0, 0) (3, 0, 0, 0) (4, 0, 0, 0) (5, 0, 0, 0) | N/A | (0, 0, 0, 1) (0, 0, 1, 0) (1, 0, 0, 1) (1, 0, 1, 0) (2, 0, 0, 1) (2, 0, 1, 0) | (3, 0, 0, 1) (3, 0, 1, 1) (4, 0, 0, 1) (4, 0, 1, 1) (5, 0, 0, 1) (5, 0, 1, 1) | (3, 0, 0, 0) (3, 0, 1, 0) (4, 0, 0, 0) (4, 0, 1, 0) (5, 0, 0, 0) (5, 0, 1, 0) | N/A | (6, 0, 0, 1) (7, 0, 0, 1) (8, 0, 0, 1) (9, 0, 0, 1) (10, 0, 0, 1) (11, 0, 0, 1) | (6, 0, 0, 0) (7, 0, 0, 0) (8, 0, 0, 0) (9, 0, 0, 0) (10, 0, 0, 0) (11, 0, 0, 0) | N/A | (3, 0, 0, 1) (3, 0, 1, 0) (4, 0, 0, 1) (4, 0, 1, 0) (5, 0, 0, 1) (5, 0, 1, 0) |
| (omitted) | | | | | | | | | | | | | | |
| 57 | (0, 0, 0, \*) (0, 0, 1, \*) (1, 0, 0, \*) (1, 0, 1, \*) (2, 0, 0, \*) (2, 0, 1, \*) | (0, 0, 0, \*) (0, 0, 1, \*) (1, 0, 0, \*) (1, 0, 1, \*) (2, 0, 0, \*) (2, 0, 1, \*) | (0, 0, 0, \*) (0, 0, 1, \*) (1, 0, 0, \*) (1, 0, 1, \*) (2, 0, 0, \*) (2, 0, 1, \*) | (0, 0, 0, \*) (1, 0, 0, \*) (2, 0, 0, \*) (3, 0, 0, \*) (4, 0, 0, \*) (5, 0, 0, \*) | (0, 0, 0, \*) (1, 0, 0, \*) (2, 0, 0, \*) (3, 0, 0, \*) (4, 0, 0, \*) (5, 0, 0, \*) | (0, 0, 0, \*) (1, 0, 0, \*) (2, 0, 0, \*) (3, 0, 0, \*) (4, 0, 0, \*) (5, 0, 0, \*) | (0, 0, 0, \*) (0, 0, 1, \*) (1, 0, 0, \*) (1, 0, 1, \*) (2, 0, 0, \*) (2, 0, 1, \*) | (3, 0, 0, \*) (3, 0, 1, \*) (4, 0, 0, \*) (4, 0, 1, \*) (5, 0, 0, \*) (5, 0, 1, \*) | (3, 0, 0, \*) (3, 0, 1, \*) (4, 0, 0, \*) (4, 0, 1, \*) (5, 0, 0, \*) (5, 0, 1, \*) | (3, 0, 0, \*) (3, 0, 1, \*) (4, 0, 0, \*) (4, 0, 1, \*) (5, 0, 0, \*) (5, 0, 1, \*) | (6, 0, 0, \*) (7, 0, 0, \*) (8, 0, 0, \*) (9, 0, 0, \*) (10, 0, 0, \*) (11, 0, 0, \*) | (6, 0, 0, \*) (7, 0, 0, \*) (8, 0, 0, \*) (9, 0, 0, \*) (10, 0, 0, \*) (11, 0, 0, \*) | (6, 0, 0, \*) (7, 0, 0, \*) (8, 0, 0, \*) (9, 0, 0, \*) (10, 0, 0, \*) (11, 0, 0, \*) | (3, 0, 0, \*) (3, 0, 1, \*) (4, 0, 0, \*) (4, 0, 1, \*) (5, 0, 0, \*) (5, 0, 1, \*) |
| (omitted) | | | | | | | | | | | | | | |

In Table 3, using the prach-ConfigurationIndex being 0 and the 0th resource configuration (0, 1, 0, 2) of the ordinary terminal as an example, four parameters in brackets) respectively denote $f_{RA}$, $t_{RA}^{(0)}$, $t_{RA}^{(1)}$, $t_{RA}^{(2)}$.

No matter whether it is for the configuration (Table 2) in the FDD system or the configuration (Table 3) in the TDD system, under a same prach-ConfigurationIndex, different time domain resources are separately configured for the ordinary terminal and the MTC terminal. Therefore, when the base station delivers a same prach-ConfigurationIndex to the terminals through upper-layer RRC signaling, the ordinary terminal and the MTC terminal can obtain different time domain resources according to the prach-ConfigurationIndex, and perform random access to the base station according to the different time domain resources.

In a second manner, the base station preconfigures an ordinary terminal resource configuration table and an MTC terminal resource configuration table, where the ordinary terminal resource configuration table includes an indication relationship between a first random access configuration index and a first time domain resource, and the MTC terminal resource configuration table includes an indication relationship between a second random access configuration index and a second time domain resource; the base station notifies a parameter for performing the random access for the terminal through RRC broadcast or unicast signaling, where the RRC broadcast or unicast signaling includes a first random access configuration index configured for an ordinary terminal, and a second random access configuration index configured for an MTC terminal; the terminal obtains a corresponding random access configuration index in the RRC signaling according to the type of the terminal, searches for a time domain resource corresponding to the random access configuration index, and sends a preamble sequence to the base station through the found time domain resource; after receiving the preamble sequence, the base station determines, when the preamble sequence sent by the terminal is detected on the first time domain resource indicated by the one first random access configuration index, that the terminal is an ordinary terminal, and determines, when the preamble sequence sent by the terminal is detected on the second time domain resource indicated by the one second random access configuration index, the terminal is an MTC terminal.

An example of the RRC signaling in the second manner is shown as follows, and different prach-ConfigurationIndexes are configured for the MTC terminal and the ordinary terminal in the RRC signaling. An information element PRACH-ConfigInfo in the RRC signaling may include:

| | |
|---|---|
| PRACH-ConfigInfo::= | SEQUENCE { |
| prach-ConfigIndex-for-MTC | INTEGER (0..63), |
| prach-ConfigIndex-for-NonMTC | INTEGER (0..63), |
| highSpeedFlag | BOOLEAN, |
| zeroCorrelationZoneConfig | INTEGER (0..15), |
| prach-FreqOffset | INTEGER (0..94) |
| } | |

In the foregoing PRACH-ConfigInfo, the parameter prach-ConfigIndex-for-NonMTC is a prach-Configuration- Index configured by the base station for an ordinary UE, namely, the first random access configuration index, the parameter prach-ConfigIndex-for-MTC is a prach-ConfigurationIndex configured by the base station for an MTC UE, namely, the second random access configuration index, and values of the foregoing two prach-ConfigurationIndexes are integers in a range from 0 to 63. In the foregoing PRACH-ConfigInfo, meanings of other parameters are the same as those in the prior art, the parameter highSpeedFlag is a high-speed flag bit, the parameter zeroCorrelationZoneConfig indicates a parameter value used for calculating the cyclic displacement magnitude, and the parameter prach-FreqOffset is a frequency offset value $n_{PRBoffset}^{RA}$. $n_{PRBoffset}^{RA}$ indicates a sequence number of a first RB which a PRACH preamble sequence can occupy in the FDD, and decides a frequency domain resource in a subframe. $n_{PRBoffset}^{RA}$ and parameters such as a sequence number $f_{RA}$ of a frequency resource, and a quantity of available uplink RBs jointly decide a frequency domain resource which a PRACH preamble sequence can occupy in the TDD.

For an FDD system, after receiving RRC signaling, the ordinary terminal searches for the following Table 4 according to the parameter prach-ConfigIndex-for-NonMTC in the RRC signaling, and obtains a system frame and a subframe location which are used for sending a PRACH preamble sequence. The following Table 4 is an example of an ordinary terminal resource configuration table preconfigured by the base station, and includes an indication relationship between a first random access configuration index and a preamble sequence format, a system frame number as well as a subframe number, where the first time domain resource is determined by a system frame number and a subframe number in Table 4.

TABLE 4-continued

| PRACH Configuration Index | Preamble sequence format | System frame number | Subframe number |
|---|---|---|---|
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| (omitted) | | | |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |

In the foregoing Table 4, part of time domain resource configuration information at the time when the preamble sequence format is 0 for the ordinary terminal is only shown, Even that is under the system frame number indicates a system frame number of an even number type, and Any indicates any system frame number.

For a TDD system, after receiving RRC signaling, the ordinary terminal searches for the following Table 5 according to the parameter prach-ConfigIndex-for-NonMTC in the RRC signaling, and obtains a system frame and a subframe location which are used for sending a PRACH preamble sequence. The following Table 5 is the ordinary terminal resource configuration table preconfigured by the base station, where the first time domain resource is determined by values of $t_{RA}^{(0)}$, $t_{RA}^{(1)}$ and $t_{RA}^{(2)}$ in Table 5.

TABLE 5

| PRACH configuration Index | TDD UL/DL configuration | | | | | | |
|---|---|---|---|---|---|---|---|
| | 0 | 1 | 2 | 3 | 4 | 5 | 6 |
| 0 | (0, 1, 0, 2) | (0, 1, 0, 1) | (0, 1, 0, 0) | (0, 1, 0, 2) | (0, 1, 0, 1) | (0, 1, 0, 0) | (0, 1, 0, 2) |
| 1 | (0, 2, 0, 2) | (0, 2, 0, 1) | (0, 2, 0, 0) | (0, 2, 0, 2) | (0, 2, 0, 1) | (0, 2, 0, 0) | (0, 2, 0, 2) |
| 2 | (0, 1, 1, 2) | (0, 1, 1, 1) | (0, 1, 1, 0) | (0, 1, 0, 1) | (0, 1, 0, 0) | N/A | (0, 1, 1, 1) |
| 3 | (0, 0, 0, 2) | (0, 0, 0, 1) | (0, 0, 0, 0) | (0, 0, 0, 2) | (0, 0, 0, 1) | (0, 0, 0, 0) | (0, 0, 0, 2) |
| 4 | (0, 0, 1, 2) | (0, 0, 1, 1) | (0, 0, 1, 0) | (0, 0, 0, 1) | (0, 0, 0, 0) | N/A | (0, 0, 1, 1) |
| 5 | (0, 0, 0, 1) | (0, 0, 0, 0) | N/A | (0, 0, 0, 0) | N/A | N/A | (0, 0, 0, 1) |
| 6 | (0, 0, 0, 2) | (0, 0, 0, 1) | (0, 0, 0, 0) | (0, 0, 0, 1) | (0, 0, 0, 0) | (0, 0, 0, 0) | (0, 0, 0, 2) |
| | (0, 0, 1, 2) | (0, 0, 1, 1) | (0, 0, 1, 0) | (0, 0, 0, 2) | (0, 0, 0, 1) | (1, 0, 0, 0) | (0, 0, 1, 1) |
| 7 | (0, 0, 0, 1) | (0, 0, 0, 0) | N/A | (0, 0, 0, 0) | N/A | N/A | (0, 0, 0, 1) |
| | (0, 0, 1, 1) | (0, 0, 1, 0) | | (0, 0, 0, 2) | | | (0, 0, 1, 0) |
| 8 | (0, 0, 0, 0) | N/A | N/A | (0, 0, 0, 0) | N/A | N/A | (0, 0, 0, 0) |
| | (0, 0, 1, 0) | | | (0, 0, 0, 1) | | | (0, 0, 1, 1) |
| 9 | (0, 0, 0, 1) | (0, 0, 0, 0) | (0, 0, 0, 0) | (0, 0, 0, 0) | (0, 0, 0, 0) | (0, 0, 0, 0) | (0, 0, 0, 1) |
| | (0, 0, 0, 2) | (0, 0, 0, 1) | (0, 0, 1, 0) | (0, 0, 0, 1) | (0, 0, 0, 1) | (1, 0, 0, 0) | (0, 0, 0, 2) |
| | (0, 0, 1, 2) | (0, 0, 1, 1) | (1, 0, 0, 0) | (0, 0, 0, 2) | (1, 0, 0, 1) | (2, 0, 0, 0) | (0, 0, 1, 1) |
| (omitted) | | | | | | | |

TABLE 4

| PRACH Configuration Index | Preamble sequence format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |

In Table 5, using the prach-ConfigurationIndex being 0 and the 0th resource configuration (0, 1, 0, 2) as an example, four parameters in brackets denote $f_{RA}$, $t_{RA}^{(0)}$, $t_{RA}^{(1)}$, $t_{RA}^{(2)}$, respectively, and the meanings of the foregoing four parameters are consistent with those in the foregoing description, and details are not repeatedly described herein.

The foregoing Table 4 and Table 5 are the same as configuration tables of FDD and TDD systems in the existing protocol.

For an FDD system, after receiving RRC signaling, the MTC terminal searches for the following Table 6 according to the parameter prach-ConfigIndex-for-NonMTC in the RRC signaling, and obtains a system frame and a subframe location which are used for sending a PRACH preamble sequence. The following Table 6 is the MTC terminal resource configuration table preconfigured by the base station, and includes an indication relationship between a second random access configuration index and a preamble For a TDD system, after receiving RRC signaling, the MTC terminal searches for the following Table 7 according to the parameter prach-ConfigIndex-for-NonMTC in the RRC signaling, and obtains a system frame and a subframe location which are used for sending a PRACH preamble sequence. The following Table 7 is the MTC terminal resource configuration table preconfigured by the base station, where the second time domain resource is determined by values of $t_{RA}^{(0)}$, $t_{RA}^{(1)}$ and $t_{RA}^{(2)}$ in Table 7.

TABLE 7

| PRACH configuration Index for MTC | TDD UL/DL configuration | | | | | | |
|---|---|---|---|---|---|---|---|
| | 0 | 1 | 2 | 3 | 4 | 5 | 6 |
| 0 | (0, 2, 0, 2) | (0, 2, 0, 1) | (0, 2, 0, 0) | (0, 2, 0, 2) | (0, 2, 0, 1) | (0, 2, 0, 0) | (0, 2, 0, 2) |
| 1 | (0, 1, 0, 2) | (0, 1, 0, 1) | (0, 1, 0, 0) | (0, 1, 0, 2) | (0, 1, 0, 1) | (0, 1, 0, 0) | (0, 1, 0, 2) |
| 2 | (0, 2, 1, 2) | (0, 2, 1, 1) | (0, 2, 1, 0) | (0, 2, 0, 1) | (0, 2, 0, 0) | N/A | (0, 2, 1, 1) |
| 3 | (0, 0, 1, 2) | (0, 0, 1, 1) | (0, 0, 1, 0) | (0, 0, 0, 0) | (0, 0, 0, 0) | (1, 0, 0, 0) | (0, 0, 1, 1) |
| 4 | (0, 0, 0, 2) | (0, 0, 0, 1) | (0, 0, 0, 0) | (0, 0, 0, 2) | (0, 0, 0, 1) | N/A | (0, 0, 0, 2) |
| 5 | (0, 0, 1, 1) | (0, 0, 1, 0) | N/A | (0, 0, 0, 1) | N/A | N/A | (0, 0, 1, 1) |
| 6 | (0, 0, 0, 0) | (0, 0, 0, 0) | (1, 0, 0, 0) | (0, 0, 0, 0) | (1, 0, 0, 0) | (2, 0, 0, 0) | (0, 0, 0, 0) |
| | (0, 0, 1, 0) | (0, 0, 1, 0) | (1, 0, 1, 0) | (0, 0, 0, 1) | (1, 0, 0, 1) | (3, 0, 0, 0) | (0, 0, 1, 1) |
| 7 | (0, 0, 0, 2) | (0, 0, 0, 1) | N/A | (0, 0, 0, 1) | N/A | N/A | (0, 0, 0, 2) |
| | (0, 0, 1, 2) | (0, 0, 1, 1) | | (0, 0, 0, 2) | | | (0, 0, 1, 1) |
| 8 | (0, 0, 0, 1) | N/A | N/A | (0, 0, 0, 0) | N/A | N/A | (0, 0, 0, 1) |
| | (0, 0, 1, 1) | | | (0, 0, 0, 2) | | | (0, 0, 1, 0) |
| (omitted) | | | | | | | |
| 29/39 | (3, 0, 0, 1) | (3, 0, 0, 0) | N/A | (6, 0, 0, 1) | (6, 0, 0, 0) | N/A | (3, 0, 0, 1) |
| | (3, 0, 1, 1) | (3, 0, 1, 0) | | (7, 0, 0, 1) | (7, 0, 0, 0) | | (3, 0, 1, 0) |
| | (4, 0, 0, 1) | (4, 0, 0, 0) | | (8, 0, 0, 1) | (8, 0, 0, 0) | | (4, 0, 0, 1) |
| | (4, 0, 1, 1) | (4, 0, 1, 0) | | (9, 0, 0, 1) | (9, 0, 0, 0) | | (4, 0, 1, 0) |
| | (5, 0, 0, 1) | (5, 0, 0, 0) | | (10, 0, 0, 1) | (10, 0, 0, 0) | | (5, 0, 0, 1) |
| | (5, 0, 1, 1) | (5, 0, 1, 0) | | (11, 0, 0, 1) | (11, 0, 0, 0) | | (5, 0, 1, 0) |
| (omitted) | | | | | | | |
| 57 | (3, 0, 0, *) | (3, 0, 0, *) | (3, 0, 0, *) | (6, 0, 0, *) | (6, 0, 0, *) | (6, 0, 0, *) | (3, 0, 0, *) |
| | (3, 0, 1, *) | (3, 0, 1, *) | (3, 0, 1, *) | (7, 0, 0, *) | (7, 0, 0, *) | (7, 0, 0, *) | (3, 0, 1, *) |
| | (4, 0, 0, *) | (4, 0, 0, *) | (4, 0, 0, *) | (8, 0, 0, *) | (8, 0, 0, *) | (8, 0, 0, *) | (4, 0, 0, *) |
| | (4, 0, 1, *) | (4, 0, 1, *) | (4, 0, 1, *) | (9, 0, 0, *) | (9, 0, 0, *) | (9, 0, 0, *) | (4, 0, 1, *) |
| | (5, 0, 0, *) | (5, 0, 0, *) | (5, 0, 0, *) | (10, 0, 0, *) | (10, 0, 0, *) | (10, 0, 0, *) | (5, 0, 0, *) |
| | (5, 0, 1, *) | (5, 0, 1, *) | (5, 0, 1, *) | (11, 0, 0, *) | (11, 0, 0, *) | (11, 0, 0, *) | (5, 0, 1, *) |
| (omitted) | | | | | | | | sequence format, a system frame number as well as a subframe number, where the second time domain resource is determined by a system frame number and a subframe number in the table.

TABLE 6

| PRACH Configuration Index for MTC | Preamble sequence format | System frame number | Subframe number of MTC terminal |
|---|---|---|---|
| 0 | 0 | Even | 3 |
| 1 | 0 | Even | 5 |
| 2 | 0 | Even | 2 |
| 3 | 0 | Any | 3 |
| 4 | 0 | Any | 5 |
| 5 | 0 | Any | 2 |
| 6 | 0 | Any | 3, 8 |
| 7 | 0 | Any | 4, 9 |
| (omitted) | | | |

In the foregoing Table 6, part of time domain resource configuration information at the time when the preamble sequence format is 0 for the MTC terminal is only exemplarily shown, Even under the system frame number indicates a system frame number of an even number type, and Any indicates any system frame number.

In Table 7, using the prach-ConfigurationIndex being 0 and the 0th resource configuration (0, 2, 0, 2) as an example, four parameters in brackets respectively denote $f_{RA}$, $t_{RA}^{(0)}$, $t_{RA}^{(1)}$, $t_{RA}^{(2)}$, and the meanings of the foregoing four parameters are consistent with those in the foregoing description, and details are not repeatedly described herein. No matter whether it is for the FDD system or the TDD system, after the terminal sends the preamble sequence, after detecting a time domain resource on which the terminal sends the preamble sequence, the base station can determine the terminal is an ordinary terminal if the time domain resource is found in Table 4 or Table 6, and can determine the terminal is an MTC terminal if the time domain resource is found in Table 5 or Table 7.

In a third manner: the base station preconfigures a second resource configuration table, where the second resource configuration table includes an indication relationship between a random access configuration index of the terminal and a time domain resource; the base station notifies a parameter for performing the random access for the terminal through RRC broadcast or unicast signaling, where the RRC broadcast or unicast signaling includes a random access configuration index configured for the terminal; the terminal searches for a second resource configuration table according to the random access configuration index and sends a preamble sequence directly according to a time domain resource found from the second resource configuration table if the terminal is an ordinary terminal; and offsets a time domain resource found from the second resource configuration table according to a designated time domain resource offset value and sends a preamble sequence on an offset time domain resource if the terminal is an MTC terminal; after receiving the preamble sequence, the base station determines, when the preamble sequence sent by the terminal is detected on the time domain resource indicated by the one random access configuration index, the terminal is an ordinary terminal, and determines, when the preamble sequence sent by the terminal is detected on a time domain resource obtained after the time domain resource indicated by the one random access configuration index is offset according to a designated time domain resource offset value, the terminal is an MTC terminal.

The time domain resource offset value of the preamble sequence sent by the ordinary terminal and the MTC terminal is a time domain resource offset value notified through the RRC broadcast or unicast signaling, or a preconfigured time domain resource offset value, such as a time domain resource offset value stipulated through a protocol, which is not limited in this embodiment.

An example of the RRC signaling in the third manner is shown as follows, and the information element PRACH-ConfigInfo in the RRC signaling may include:

| PRACH-ConfigInfo::= | SEQUENCE { |
|---|---|
| prach-ConfigIndex | INTEGER (0..63), |
| subframeOffset | INTEGER (0..9), |
| highSpeedFlag | BOOLEAN, |
| zeroCorrelationZoneConfig | INTEGER (0..15), |
| prach-FreqOffset | INTEGER (0..94) |
| } | |

In the foregoing PRACH-ConfigInfo, the parameter subframeOffset indicates a time domain resource offset value of the preamble sequence sent by the ordinary terminal and the MTC terminal, whose value can be an integer of 0 to 9, the parameter prach-ConfigIndex is the one random access configuration index, and meanings of other parameters are the same as those in the prior art, and are consistent with those in the foregoing description, which are not described anymore here.

In the foregoing third manner, for an FDD system, the foregoing Table 4 can be specifically adopted as the second resource configuration table, and for a TDD system, the foregoing Table 5 can be specifically adopted as the second resource configuration table, which is not described anymore here. Using an FDD system as an example, when the prach-ConfigIndex notified by the base station in the RRC signaling is 1, and the subframeOffset is 1, when receiving the RRC signaling, the terminal searches for Table 4 according to that the prach-ConfigIndex is 1, and the obtained subframe number is "4"; for the ordinary terminal, the preamble sequence is sent on the fourth subframe; for the MTC terminal, the subframe number "4" and the subframeOffset "1" are added to obtain a subframe number "5", and the MTC terminal sends the preamble sequence on the fifth subframe; after the base station receives the preamble sequence, if it is detected that the preamble sequence is sent on the fourth subframe, and the corresponding subframe number found according to the prach-ConfigIndex "1" in the RRC signaling is "4", it can be determined that the terminal sending the preamble sequence is the ordinary terminal; if it is detected that the preamble sequence is sent on the fifth subframe, and the corresponding subframe number found according to the prach-ConfigIndex "1" in the RRC signaling is "4", the subframe number "4" and the subframeOffset "1" are added to obtain a subframe number "5" consistent with the detected subframe, so it can be determined that the terminal sending the preamble sequence is the MTC terminal.

Step 203: Send, according to the type of the terminal, a random access response message and a competition solution message to the terminal on processing bandwidth supported by the terminal.

In the three manners of identifying a type of a terminal of this embodiment, different time domain resources are configured for preamble sequences sent by an MTC terminal and an ordinary terminal. Correspondingly, when the base station identifies the type of the terminal, and sends messages related to random access response and competition solution to the terminal, for the MTC terminal, these messages can be sent on small bandwidth which the MTC terminal is capable of processing for the MTC terminal, and for the ordinary terminal, these messages can be sent on full bandwidth for the ordinary terminal. The MTC terminal and the ordinary terminal can detect a physical downlink control channel (PDCCH) by using different random access radio network temporary identifier (RA-RNTI) values, and then continues to demodulate a media access control protocol data unit (MAC PDU) borne on a physical downlink shared channel (PDSCH) and indicated by the PDCCH, so random access response messages sent by the base station to the MTC terminal and the ordinary terminal are located on different PDSCHs, which include different temporary C-RNTIs, thereby avoiding the conflict between the MTC terminal and the ordinary terminal in the random access procedure.

It can be seen from the foregoing embodiment that, the base station can distinguish an MTC terminal and an ordinary terminal according to different time domain resources in a random access procedure, so influence of the MTC terminal on the ordinary terminal in the random access procedure is reduced, collision between the MTC terminal and the ordinary terminal which send a preamble sequence on a same time frequency resource is avoided, competition between the MTC terminal and the ordinary terminal in the random access procedure is alleviated, and the random access quality of the ordinary terminal is improved. Additionally, after the terminal sends a preamble sequence to the base station, the base station can know the type of the terminal, so for an MTC terminal, a message which the MTC terminal can process can be sent on small bandwidth, and for an ordinary terminal, a message which the ordinary terminal can process can be sent on a full frequency band, thereby ensuring that the reception performance of the ordinary terminal is not affected by the MTC terminal.

Figure 3:
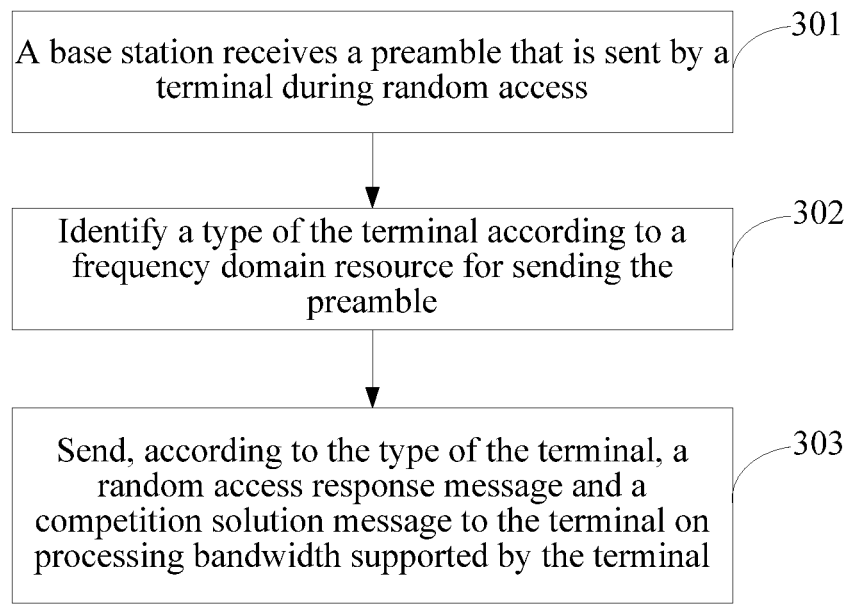
FIG. 3 is a flow chart of another embodiment of a random access method according to the present invention.

FIG. 3 is another embodiment of a random access method according to the present invention, and the embodiment shows a random access procedure in which a base station distinguishes types of terminals according to preamble sequences sent by the terminals on different frequency domain resources.

Step 301: A base station receives a preamble sequence that is sent by a terminal during random access.

The preamble sequence sent by the terminal to the base station is borne through a PRACH, and the preamble sequence is formed of a sequence duration ($T_{SEQ}$) and a cyclic prefix duration ($T_{CP}$). The formation of the preamble sequence borne by the PRACH is classified into five formats, which are shown in the foregoing Table 1. Format 0 to format 3 of the preamble sequence in Table 1 may be used for an FDD system, and format 0 to format 4 of the preamble sequence in Table 1 may be used for a TDD system.

In this embodiment, types of terminals are classified into an ordinary terminal and an MTC terminal, and the ordinary terminal and the MTC terminal send preamble sequences on different frequency domain resources.

Step 302: Identify a type of the terminal according to a frequency domain resource for sending the preamble sequence.

The base station distinguishes the types of the terminals through the preamble sequences sent by the ordinary terminal and the MTC terminal on different frequency domain resources. The base station can identify a type of a terminal according to two frequency domain resource configuration manners.

In a first manner, the base station notifies a parameter for performing the random access for the terminal through RRC broadcast or unicast signaling, where the RRC broadcast or unicast signaling includes indication information of a first frequency domain resource configured for an ordinary terminal, and indication information of a second frequency domain resource configured for an MTC terminal; after receiving RRC signaling, the terminal obtains a corresponding frequency domain resource according to the type of the terminal, sends a preamble sequence on a first frequency domain resource if the terminal is an ordinary terminal, and sends a preamble sequence on a second frequency domain resource if the terminal is an MTC terminal; after receiving the preamble sequence sent by the terminal, the base station determines, when that the terminal sends a preamble sequence on the first frequency domain resource is detected, that the terminal is an ordinary terminal, and determines, when that the terminal sends a preamble sequence on the second frequency domain resource is detected, that the terminal is an MTC terminal, where the first frequency domain resource and the second frequency domain resource are different frequency domain resources.

For an FDD system, a first physical random access channel frequency offset prach-Frequencyoffset configured for an ordinary terminal and used as indication information of the first frequency domain resource, and a second physical random access channel frequency offset prach-Frequencyoffset configured for an MTC terminal and used as indication information of the second frequency domain resource can be notified in the RRC broadcast or unicast signaling, and the information element PRACH-ConfigInfo in the RRC signaling may include:

| | |
|---|---|
| PRACH-ConfigInfo::= | SEQUENCE { |
| prach-ConfigIndex | INTEGER (0..63), |
| highSpeedFlag | BOOLEAN, |
| zeroCorrelationZoneConfig | INTEGER (0..15), |
| prach-FreqOffset -for-NonMTC | INTEGER (0..94) |
| prach-FreqOffset -for-MTC | INTEGER (0..94) |
| } | |

In the foregoing PRACH-ConfigInfo, the parameters prach-FreqOffset-for-NonMTC and prach-FreqOffset-for-MTC respectively denote a first physical random access channel frequency offset of the ordinary terminal and a second physical random access channel frequency offset of the MTC terminal, which set different sequence numbers of the first physical resource block which can be occupied at the time of sending the preamble sequence, and respectively indicate a starting point of a first frequency resource of the ordinary terminal and a starting point of a second frequency resource of the MTC terminal in a subframe, so in a subframe, a quantity of frequency domain resources which can be used for sending the preamble sequence is two in total. In the foregoing PRACH-ConfigInfo, meanings of other parameters are the same as those in the prior art, which are not repeatedly described herein.

For a TDD system, a manner same as that of the FDD system may be adopted, where a first physical random access channel frequency offset prach-Frequencyoffset configured for an ordinary terminal and used as indication information of the first frequency domain resource, and a second physical random access channel frequency offset prach-Frequencyoffset configured for an MTC terminal and used as indication information of the second frequency domain resource are notified in the RRC broadcast or unicast signaling. In the information element PRACH-ConfigInfo in the RRC signaling, the parameters prach-FreqOffset-for-NonMTC and prach-FreqOffset-for-MTC respectively denote a first physical random access channel frequency offset of the ordinary terminal and a second physical random access channel frequency offset of the MTC terminal, different physical resource block sequence numbers are configured for the ordinary terminal and the MTC terminal through the parameters prach-FreqOffset-for-NonMTC and prach-FreqOffset-for-MTC, and the foregoing manner may be used for format 0 to format 3 shown in Table 1. The ordinary terminal can calculate the starting point of the first frequency domain resource which the preamble sequence of the ordinary terminal can occupy according to parameters such as the prach-FreqOffset-for-NonMTC, the frequency domain resource sequence number $f_{RA}$, and a quantity of available uplink RBs.

The MTC terminal can calculate the starting point of the second frequency domain resource which the preamble sequence of the MTC terminal can occupy according to parameters such as the prach-FreqOffset-for-MTC, the frequency domain resource sequence number $f_{RA}$, and the quantity of available uplink RBs. The starting point of the first frequency domain resource calculated by the ordinary terminal and the starting point of the second frequency domain resource calculated by the MTC terminal are different. In the prior art, a TDD system allows an uplink subframe to have a maximum of 6 frequency domain resources used for random access, while in this embodiment, because different frequency domain resources are allocated respectively for the ordinary terminal and the MTC terminal, so a subframe may have a maximum of 12 frequency domain resources used for random access.

Additionally, optionally, in this embodiment, when different frequency domain resources are configured for different types of terminals, the base station can also adopt a manner similar to the first manner in the embodiment shown in the foregoing FIG. 2, where a same random access configuration index prach-ConfigurationIndex configured for the ordinary terminal and the MTC terminal and used as indication information of the first frequency domain resource and indication information of the second frequency domain resource is notified in the RRC broadcast or unicast signaling, and the same random access configuration index prach-ConfigurationIndex is used for respectively indicating the first frequency domain resource and the second frequency domain resource for the ordinary terminal and the MTC terminal, that is, in the parameter ($f_{RA}$, $t_{RA}^{(0)}$, $t_{RA}^{(1)}$, $t_{RA}^{(2)}$) indicated by the prach-ConfigurationIndex and denoting a resource location, values of $f_{RA}$ can be different for the MTC terminal and the ordinary terminal. For example, as shown in the foregoing Table 3, a quantity of values of $f_{RA}$ can be 12 at most. Taking the prach-ConfigurationIndex being 57 and the TDD uplink/downlink ratio being 3 as an example, for the ordinary terminal, $f_{RA}$ can be 0, 1, 2, 3, 4, or 5, and used for calculating the starting point of the first frequency resource, and for the MTC terminal, $f_{RA}$ can be 6, 7, 8, 9, or 10, and be used for calculating the starting point of the second frequency resource, so a subframe may have a maximum of 12 frequency domain resources used for random access. This configuration manner may be used for format 0 to format 4 shown in Table 1.

Additionally, optionally, in this embodiment, when different frequency domain resources are configured for different types of terminals, the base station can also adopt a manner similar to the second manner in the embodiment shown in the foregoing FIG. 2, where a first random access configuration index configured for an ordinary terminal and used as indication information of the first frequency domain resource, and a second random access configuration index configured for an MTC terminal and used as indication information of the second frequency domain resource are notified in the RRC broadcast or unicast signaling. The parameter prach-ConfigIndex-for-NonMTC is a prach-ConfigurationIndex configured by the base station for an ordinary terminal, namely, the first random access configuration index, and the parameter prach-ConfigIndex-for-MTC is a prach-ConfigurationIndex configured by the base station for an MTC UE, namely, the second random access configuration index. The ordinary terminal searches for the foregoing Table 5 according to the prach-ConfigIndex-for-NonMTC to obtain $f_{RA}$, which is used for calculating the starting point of the first frequency resource, the MTC terminal searches for Table 7 according to the prach-ConfigIndex-for-MTC to obtain $f_{RA}$, which is used for calculating the starting point of the second frequency resource, and values of $f_{RA}$ of the ordinary terminal and the MTC terminal can be different. The quantity of values of $f_{RA}$ may be 12 at most, and a subframe may have a maximum of 12 frequency domain resources used for random access. This configuration manner may be used for format 0 to format 4 shown in Table 1.

In a second manner, a parameter for performing the random access is notified for the terminal through RRC broadcast or unicast signaling, where the RRC broadcast or unicast signaling includes indication information of a first frequency domain resource configured for the terminal, and the indication information of the first frequency domain resource includes a physical random access channel frequency offset prach-Frequencyoffset and/or a random access configuration index; after the terminal receives RRC signaling, if the terminal is an ordinary terminal, the terminal directly sends a preamble sequence according to a first frequency domain resource, and if the terminal is an MTC terminal, the terminal offsets the first frequency domain resource according to a designated frequency domain resource offset value to obtain an offset frequency domain resource, and sends a preamble sequence according to the offset frequency domain resource; after receiving the preamble sequence, the base station determines, when that the terminal sends a preamble sequence on the first frequency domain resource is detected, that the terminal is an ordinary terminal, and determines, when that a frequency domain resource on which the terminal sends the preamble sequence is a frequency domain resource obtained after the first frequency domain resource is offset according to a designated frequency domain resource offset value is detected, the terminal is an MTC terminal.

The designated frequency domain resource offset value is a frequency domain resource offset value notified through the RRC broadcast or unicast signaling, or a preconfigured frequency domain resource offset value, such as a frequency domain resource offset value stipulated through a protocol, which is not limited in this embodiment. An example of the RRC signaling in the second manner is shown as follows, and the information element PRACH-ConfigInfo in the RRC signaling may include:

| PRACH-ConfigInfo::= | | SEQUENCE { |
|---|---|---|
| prach-ConfigIndex | | INTEGER (0..63), |
| highSpeedFlag | | BOOLEAN, |
| zeroCorrelationZoneConfig | | INTEGER (0..15), |
| prach-FreqOffset | | INTEGER (0..94) |
| prach-FreqOffset | -forMTC | INTEGER (0..94) |
| } | | |

In the foregoing PRACH-ConfigInfo, the parameter prach-FreqOffset-forMTC indicates the frequency domain resource offset value, the parameter prach-ConfigIndex is the random access configuration index, the parameter prach-FreqOffset is the physical random access channel frequency offset, and the both prach-ConfigIndex can be used as indication information of the first frequency domain resource. Meanings of other parameters are the same as those in the prior art, and are consistent with those in the foregoing description, which are not repeatedly described herein.

In the foregoing second manner, for an FDD system, the ordinary terminal can directly obtain a first frequency domain resource used for sending the preamble sequence according to the prach-FreqOffset, and the MTC terminal can obtain a frequency domain resource used for sending the preamble sequence according to the prach-FrequencyOffset and the prach-FreqOffset-forMTC.

In the foregoing second manner, for a TDD system, when format 0 to format 3 shown in Table 1 are adopted, the MTC terminal can jointly calculate the starting point of the frequency domain resource used for sending the preamble sequence according to parameters such as $f_{RA}$, prach-FrequencyOffset, prach-FreqOffset-forMTC and the quantity of available uplink RBs; when format 4 shown in Table 1 is adopted, the MTC terminal can jointly calculate the starting point of the frequency domain resource used for sending the preamble sequence according to $f_{RA}$, prach-FreqOffset-forMTC, the quantity of available uplink RBs, a system frame number, a quantity of downlink/uplink conversion points, and $t_{RA}^{(1)}$. The foregoing procedure of calculating a frequency domain resource according to various parameters is consistent with that in the prior art, and is not described anymore here.

Step 303: Send, according to the type of the terminal, a random access response message and a competition solution message to the terminal on processing bandwidth supported by the terminal.

In the solution of this embodiment, the ordinary terminal and the MTC terminal are distinguished, so a quantity of frequency domain resources which can be used by the preamble sequence in a subframe is 12 at most. Correspondingly, when the base station sends a random access response message to the terminal, the base station can calculate an RA-RNTI according to a time frequency location of the detected preamble sequence, which can be specifically calculated according to the following formula:

RA-RNTI=1+$t\_id$+10*$f\_id$, where 0≤$t\_id$<10.

In the foregoing formula, f_id is a sequence number of a frequency domain resource occupied by a PRACH for bearing a preamble sequence in a subframe, whose value range needs to be modified from existing 0≤f_id<6 into 0≤f_id<12. Correspondingly, in the TS36.321 standard, the table defined by the RNTI can be changed into a format shown in the following Table 8:

TABLE 8

| Value (hexa-decimal) | RNTI |
| --- | --- |
| 0000 | N/A |
| 0001-0078 | RA-RNTI, C-RNTI, Semi-Persistent Scheduling C-RNTI, Temporary C-RNTI, TPC-PUCCH-RNTI and TPC-PUSCH-RNTI (see note) |
| 0079-FFF3 | C-RNTI, Semi-Persistent Scheduling C-RNTI, Temporary C-RNTI, TPC-PUCCH-RNTI and TPC-PUSCH-RNTI |
| FFF4-FFFC | Reserved for future use |
| FFFD | M-RNTI |
| FFFE | P-RNTI |
| FFFF | SI-RNTI |

In the foregoing Table 8, Value is hexadecimal, where the value range corresponding to the RA-RNTI is 0001 to 0078.

In the two manners of identifying a type of a terminal of this embodiment, different frequency domain resources are configured for preamble sequences sent by an MTC terminal and an ordinary terminal. Correspondingly, when the base station identifies the type of the terminal, and sends messages related to random access response and competition solution to the terminal, for the MTC terminal, these messages can be sent on small bandwidth which the MTC terminal is capable of processing, and for the ordinary terminal, these messages can be sent on full bandwidth for the ordinary terminal. The MTC terminal and the ordinary terminal can detect a PDCCH by using different RA-RNTI values, and then continues to demodulate a MAC PDU borne on a PDSCH and indicated by the PDCCH, so random access response messages sent by the base station to the MTC terminal and the ordinary terminal are located on different PDSCHs, which include different temporary C-RNTIs, thereby avoiding the conflict between the MTC terminal and the ordinary terminal in the random access procedure.

It can be seen from the foregoing embodiment that, the base station can distinguish an MTC terminal and an ordinary terminal according to different frequency domain resources in a random access procedure, so influence of the MTC terminal on the ordinary terminal in the random access procedure is reduced, collision between the MTC terminal and the ordinary terminal which send a preamble sequence on a same time frequency resource is avoided, competition between the MTC terminal and the ordinary terminal in the random access procedure is alleviated, and the random access quality of the ordinary terminal is improved. Additionally, after the terminal sends a preamble sequence to the base station, the base station can know the type of the terminal, so for an MTC terminal, a message which the MTC terminal can process can be sent on small bandwidth, and for an ordinary terminal, a message which the ordinary terminal can process can be sent on a full frequency band, thereby ensuring that the reception performance of the ordinary terminal is not affected by the MTC terminal.

Figure 4:
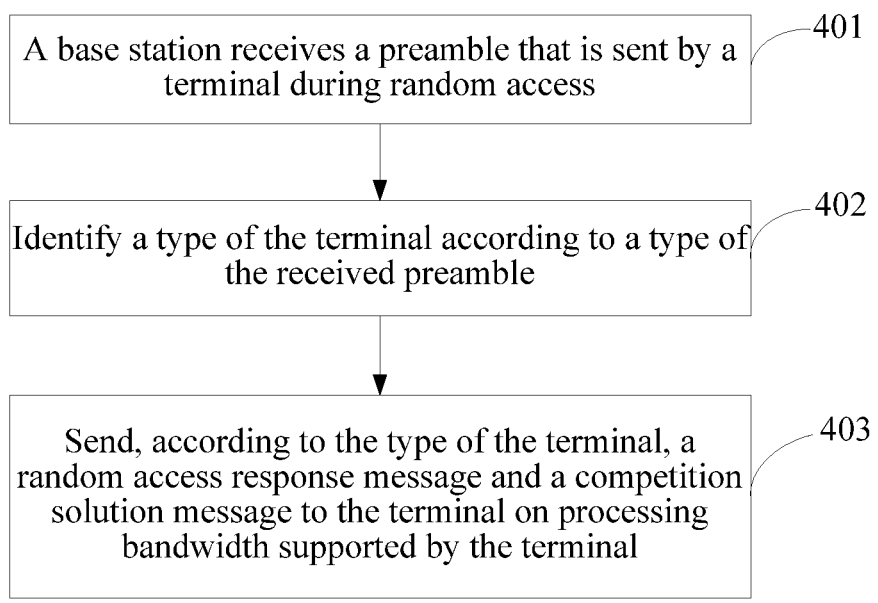
FIG. 4 is a flow chart of another embodiment of a random access method according to the present invention.

Referring to FIG. 4, FIG. 4 is another embodiment of a random access method according to the present invention, and the embodiment shows a random access procedure in which a base station distinguishes types of terminals according to different preamble sequences sent by the terminals.

Step 401: A base station receives a preamble sequence that is sent by a terminal during random access.

The preamble sequence sent by the terminal to the base station is borne through a PRACH, and the preamble sequence is formed of a sequence duration ($T_{SEQ}$) and a cyclic prefix duration ($T_{CP}$). The formation of the preamble sequence borne by the PRACH is classified into five formats, which are shown in the foregoing Table 1. Format 0 to format 3 of the preamble sequence in Table 1 may be used for an FDD system, and format 0 to format 4 of the preamble sequence in Table 1 may be used for a TDD system.

In this embodiment, types of terminals are classified into an ordinary terminal and an MTC terminal, and the ordinary terminal and the MTC terminal adopt different preamble sequences during random access.

Step 402: Identify the type of the terminal according to a type of the received preamble sequence.

The base station distinguishes the types of the terminals through the different preamble sequences sent by the ordinary terminal and the MTC terminal. The base station can identify a type of a terminal according to two manners of sending different preamble sequences. When a first preamble sequence sent by the terminal is received, it is determined that the terminal is an ordinary terminal, and when a second preamble sequence sent by the terminal is received, it is determined that the terminal is an MTC terminal.

In a first manner, an existing preamble sequence can be used as the first preamble sequence, and the second preamble sequence can be several preamble sequences newly defined for the MTC terminal.

In the prior art, there are totally 64 preamble sequences in a cell. In this embodiment, the base station can increase a quantity of preamble sequences used for random access in a cell to 64+N, where the first 64 preamble sequences are configured for the ordinary terminal, the first 64 sequences include Ncf dedicated sequences, the last N preamble sequences are configured for the MTC terminal, and are N preamble sequences newly defined for the MTC terminal, the serial numbers of the last N preamble sequences are 65, 66, . . . , and 64+N, and N is an integer. Optionally, for non-competitive random access of the MTC terminal, the sent preamble sequence can also be configured as a preamble sequence in the Ncf dedicated sequences, or some preamble sequences can be separated from the N newly defined preamble sequences and be exclusively used for non-competitive random access of the MTC terminal.

Optionally, the foregoing newly defined N preamble sequences can be generated according to a manner of generating the existing preamble sequences by adopting a root sequence for generating the 64th preamble sequence in the existing preamble sequences, and the newly defined preamble sequences are generated by sequentially increasing a cyclic displacement value of the root sequence; when the quantity of the newly defined preamble sequences generated according to the root sequence is less than N, root sequences corresponding to logic sequence numbers consecutive with a logic sequence number of the root sequence are sequentially selected; the newly defined preamble sequences are generated by performing cyclic displacement on the selected root sequences, until the quantity of the newly defined preamble sequences satisfies N.

Optionally, the base station can also notify the logic sequence number of the root sequence of the MTC terminal through RRC broadcast or unicast signaling, and the root sequence indicated by the logic sequence number of the root sequence is a first root sequence used for generating a preamble sequence used by the MTC UE. The logic sequence number of the root sequence can be notified through an information element (Information Element, IE) PRACH-ConfigSIB or PRACH-Config.

For example, the information element PRACH-Config-SIB in the RRC signaling may include:

```
PRACH-ConfigSIB::=                    SEQUENCE {
    rootSequenceIndex-for-NonMTC          INTEGER (0..837),
    rootSequenceIndex-for-MTC             INTEGER (0..837),
    prach-ConfigInfo                      PRACH-ConfigInfo
}
```

For example, the information element PRACH-Config in the RRC signaling may include:

```
PRACH-Config::=                       SEQUENCE {
    rootSequenceIndex-for-NonMTC          INTEGER (0..837),
    rootSequenceIndex-for-MTC             INTEGER (0..837),
    prach-ConfigInfo                      PRACH-ConfigInfo
                                      OPTIONAL   -- Need ON
}
```

In the foregoing IE PRACH-ConfigSIB or PRACH-Config, rootSequenceIndex-for-NonMTC is a logic sequence number of a first root sequence used for generating a preamble sequence used by the ordinary terminal, and rootSequenceIndex-for-MTC is the logic sequence number of the root sequence of the MTC terminal, which indicates the root sequence of the MTC terminal. A cyclic displacement value of the root sequence of the MTC terminal is sequentially increased to generate the newly defined preamble sequences; when the quantity of the newly defined preamble sequences generated according to the root sequence of the MTC terminal is less than N, root sequences corresponding to logic sequence numbers consecutive with the logic sequence number of the root sequence of the MTC terminal are sequentially selected; the newly defined preamble sequences are generated by performing cyclic displacement on the selected root sequences, until the quantity of the newly defined preamble sequences satisfies N. The selection of rootSequenceIndex-for-NonMTC and rootSequenceIndex-for-MTC needs to ensure that the generated N preamble sequences and 64 preamble sequences of the ordinary terminal are different from each other.

Optionally, the base station notifies the logic sequence number of the root sequence of the ordinary terminal through RRC broadcast or unicast signaling, and obtains the root sequence of the MTC terminal according to a designated root sequence offset value and the logic sequence number of the root sequence of the ordinary terminal, where the designated root sequence offset value is a root sequence offset value notified through RRC broadcast or unicast signaling, or a preconfigured root sequence offset value, such as a root sequence offset value stipulated through a protocol, which is not limited in this embodiment.

For example, the information element PRACH-Config-SIB in the RRC signaling may include:

```
PRACH-ConfigSIB::=                    SEQUENCE {
    rootSequenceIndex                     INTEGER (0..837),
    rootSequenceIndex-offset              INTEGER (0..837),
    prach-ConfigInfo                      PRACH-ConfigInfo
}
```

For example, the information element PRACH-Config in the RRC signaling may include:

```
PRACH-Config::=                       SEQUENCE {
    rootSequenceIndex                     INTEGER (0..837),
    rootSequenceIndex-offset              INTEGER (0..837),
    prach-ConfigInfo                      PRACH-ConfigInfo
                                      OPTIONAL   -- Need ON
}
```

In the foregoing IE PRACH-ConfigSIB or PRACH-Config, the rootSequenceIndex is the logic sequence number of the root sequence of the ordinary terminal, the rootSequenceIndex-offset indicates a root sequence offset value, and the logic sequence number of the root sequence of the MTC terminal is calculated according to the rootSequenceIndex-offset and the rootSequenceIndex jointly, thereby further obtaining the root sequence of the MTC terminal. A cyclic displacement value of the root sequence of the MTC terminal is sequentially increased to generate the newly defined preamble sequences; when the quantity of the newly defined preamble sequences generated according to the root sequence of the MTC terminal is less than N, root sequences corresponding to logic sequence numbers consecutive with the logic sequence number of the root sequence of the MTC terminal are sequentially selected; the newly defined preamble sequences are generated by performing cyclic displacement on the selected root sequences, until the quantity of the newly defined preamble sequences satisfies N. The selection of rootSequenceIndex-offset needs to ensure that the generated N preamble sequences and 64 preamble sequences of the ordinary terminal are different from each other.

In the prior art, the base station indicates the first 64 preamble sequences of the ordinary terminal by using a 6-bit random access preamble sequence identifier (Random Access Preamble sequence Identifier RAPID). In this embodiment, for preamble sequences No. 65, 66, . . . , and 64+N of the MTC terminal, when N is less than or equal to 64, this 6-bit RAPID is also used for denotation, so the ordinary terminal and the MTC terminal may not be distinguished in the RAPID. Alternatively, a quantity of bits of the RAPID is expanded to $\lceil \log_2(64+N) \rceil$, which is used for denoting different preamble sequences, that is, for the ordinary terminal and the MTC terminal, values of the RAPID are different.

In a second manner, the first preamble sequence is a preamble sequence in the existing preamble sequences except a dedicated sequence, and the second preamble sequence is several preamble sequences into which the dedicated sequence is divided.

There are totally 64 preamble sequences in the prior art, where Ncf dedicated sequences used for non-competitive random access are reserved, and some preamble sequences can be separated from the Ncf dedicated sequences and be exclusively used for competitive random access of the MTC terminal. The base station can notify a quantity of sequences, in the Ncf dedicated sequences, as the second preamble sequence through RRC broadcast or unicast signaling.

For example, preamble sequenceInfo in RACH-Config-Common may include:

Optionally, the designated sequence number of the initial sequence can be preconfigured, such as configured as numberOfRA-Preamble sequences, and at this time, preamble sequences with sequence numbers being numberOfRA-Preamble sequences to numberOfRA-Preamble sequences-1+numberOfRA-Preamble sequencesforMTC are used as the second preamble sequence.

Optionally, the designated sequence number of the initial sequence can also be obtained according to numberOfRA-Preamble sequencesforMTC, for example, 64-numberOfRA-Preamble sequencesforMTC+1 is used as the sequence number of the initial sequence, and at this time, preamble sequences with sequence numbers being 64-numberOfRA-Preamble sequencesforMTC+1 to 64 are used as the second preamble sequence.

```
preamble sequenceInfo                   SEQUENCE {
    numberOfRA-Preamble sequences       ENUMERATED {
                                            n4, n8, n12,
n16, n20, n24, n28,
                                            n32, n36, n40,
n44, n48, n52, n56,
                                            n60, n64},
    numberOfRA- Preamble sequences      forMTC ENUMERATED {X, Y, Z, ...}
    preamble sequencesGroupAConfig          SEQUENCE {
    sizeOfRA-Preamble sequencesGroupA       ENUMERATED {
                                            n4, n8, n12,
n16, n20, n24, n28,
                                            n32, n36, n40,
n44, n48, n52, n56,
                                            n60},
    messageSizeGroupA                   ENUMERATED {b56, b144, b208,
b256},
    messagePowerOffsetGroupB            ENUMERATED {
                                            minusinfinity,
dB0, dB5, dB8, dB10, dB12,
                                            dB15, dB18},
    ...
}                   OPTIONAL
        -- Need OP
}
```

In the foregoing preamble sequenceInfo, numberOfRA-Preamble sequences indicates a quantity of first preamble sequences, for 64 preamble sequences, preamble sequences with the sequence number 0 to numberOfRA-Preamble sequences-1 are used as the first preamble sequence, and the first preamble sequence is used for competitive random access of the ordinary terminal; numberOfRA-Preamble sequencesforMTC indicates a quantity of second preamble sequences, the second preamble sequence is obtained through the quantity of second preamble sequences and a sequence number designated as an initial sequence of the second preamble sequence, and the second preamble sequence may be used for competitive random access of the MTC terminal. Meanings of other parameters are the same as those in the prior art.

Optionally, the designated sequence number of the initial sequence can be a sequence number of the initial sequence notified through RRC broadcast or unicast signaling, and specifically, the foregoing preamble sequenceInfo can further include an IE, which is shown as follows:

startPreamble sequence-forMTC ENUMERATED {X,Y,Z, ... }.

The foregoing formula indicates the sequence number of the initial sequence. At this time, preamble sequences with sequence numbers being startPreamble sequence-forMTC to startPreamble sequence-forMTC+numberOfRA-Preamble sequencesforMTC-1 are used as the second preamble sequence.

Preamble sequences of 64 preamble sequences in a cell except the first preamble sequence and the second preamble sequence are used for non-competitive random access of the ordinary terminal and the MTC terminal.

Step 403: Send, according to the type of the terminal, a random access response message and a competition solution message to the terminal on processing bandwidth supported by the terminal.

In the solution of this embodiment, in order to respectively send the random access response message and the competition solution message of the ordinary terminal and the MTC terminal on different PDSCHs, the base station can distinguish the ordinary terminal and the MTC terminal at the time of calculating the RA-RNTI according to the time frequency location of the detected preamble sequence, which can specifically be calculated according to the following formula:

$$RA\text{-}RNTI = 1 + t\_id + 10 * f\_id + X$$

In the foregoing formula, meanings of t_id and f_id are the same as those in the prior art, and X is used for distinguishing the ordinary terminal and the MTC terminal. For example, X can be obtained in the following manner:

$$X = Y * (1 + \max(t\_id) + 10 * \max(f\_id))$$

where Y=0 indicates an ordinary terminal, and Y=1 indicates an MTC terminal.

Correspondingly, in the TS36.321 standard, the table defined by the RNTI can be changed into a format shown in the following Table 9.

TABLE 9

| Value (hexa-decimal) | RNTI |
|---|---|
| 0000 | N/A |
| 0001-FFF3 | RA-RNTI, C-RNTI, Semi-Persistent Scheduling C-RNTI, Temporary C-RNTI, TPC-PUCCH-RNTI and TPC-PUSCH-RNTI |
| FFF4-FFFC | Reserved for future use |
| FFFD | M-RNTI |
| FFFE | P-RNTI |
| FFFF | SI-RNTI |

In the foregoing Table 9, Value is hexadecimal, where the value range corresponding to the RA-RNTI is 0001 to FFF3.

In the two solutions for identifying a type of a terminal of this embodiment, different preamble sequences are adopted when the MTC terminal and the ordinary terminal send preamble sequences, and when RAPIDs for these two types of terminals are different, corresponding random access responses RAR sent by the base station are different, and temporary cell-radio network temporary identifiers (C-RNTI) included in the RARs are also different, so the conflict between the MTC terminal and the ordinary terminal at the time of sending preamble sequences is avoided. Optionally, when the base station carries information X in the RA-RNTI to indicate the MTC terminal and the ordinary terminal, the MTC terminal and the ordinary terminal can detect a PDCCH by using different RA-RNTI values, and then continues to demodulate the MAC PDU borne on the PDSCH and indicated by the PDCCH, so RARs of the MTC terminal and the ordinary terminal are located on different PDSCHs, and include different temporary C-RNTIs; not only is the conflict between the MTC terminal and the ordinary terminal avoided, but also, when the base station identifies the type of the terminal, and sends messages related to random access response and competition solution to the terminal, for the MTC terminal, these messages can be sent on small bandwidth which the MTC terminal is capable of processing for the MTC terminal, and for the ordinary terminal, these messages can be sent on full bandwidth for the ordinary terminal.

It can be seen from the foregoing embodiment that, the base station can distinguish an MTC terminal and an ordinary terminal according to different preamble sequences in a random access procedure, so influence of the MTC terminal on the ordinary terminal in the random access procedure is reduced, collision between the MTC terminal and the ordinary terminal which send a preamble sequence on a same time frequency resource is avoided, competition between the MTC terminal and the ordinary terminal in the random access procedure is alleviated, and the random access quality of the ordinary terminal is improved. Additionally, after the terminal sends a preamble sequence to the base station, the base station can know the type of the terminal, so for an MTC terminal, a message which the MTC terminal can process can be sent on small bandwidth, and for an ordinary terminal, a message which the ordinary terminal can process can be sent on a full frequency band, thereby ensuring that the reception performance of the ordinary terminal is not affected by the MTC terminal.

It should be noted that, in an actual application, the embodiments of a random access method shown in FIG. 2, FIG. 3, and FIG. 4 according to the present invention can be used separately, and can also be used in combination, which is not limited in the embodiments of the present invention.

Figure 5:
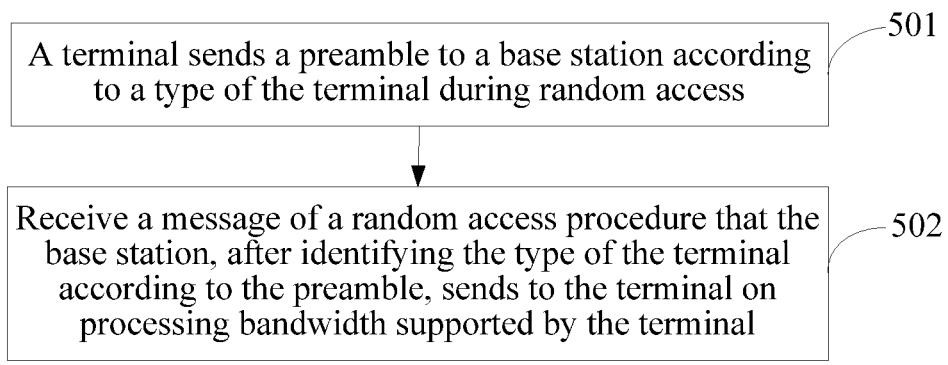
FIG. 5 is a flow chart of another embodiment of a random access method according to the present invention.

Referring to FIG. 5, FIG. 5 is another embodiment of a random access method according to the present invention, and the embodiment describes a random access procedure from a terminal side.

Step 501: A terminal sends a preamble sequence to a base station according to a type of the terminal during random access.

The terminal can send a preamble sequence to the base station on a time domain resource corresponding to the type of the terminal, and/or send a preamble sequence to the base station on a frequency domain resource corresponding to the type of the terminal, and/or send a preamble sequence corresponding to the type of the terminal to the base station.

In a first specific implementation manner, the terminal can preconfigure a first random access resource configuration table, where the first random access resource configuration table includes an indication relationship between a random access configuration index and a first time domain resource as well as a second time domain resource; and configure a first time domain resource and a second time domain resource different from the first time domain resource for an ordinary terminal and an MTC terminal, respectively, by using a same random access configuration index; the terminal receives a parameter for performing the random access notified by the base station for the terminal through RRC broadcast or unicast signaling, where the RRC broadcast or unicast signaling includes a random access configuration index configured for the terminal; the terminal sends a preamble sequence to the base station on the first time domain resource indicated by the one random access configuration index when the terminal is an ordinary terminal; the terminal sends a preamble sequence to the base station on the second time domain resource indicated by the one random access configuration index when the terminal is an MTC terminal.

In a second specific implementation manner, the terminal preconfigures an ordinary terminal resource configuration table when the terminal is an ordinary terminal, and the terminal preconfigures an MTC terminal resource configuration table when the terminal is an MTC terminal, where the ordinary terminal resource configuration table includes an indication relationship between a first random access configuration index and a first time domain resource, and the MTC terminal resource configuration table includes an indication relationship between a second random access configuration index and a second time domain resource; the terminal receives a parameter for performing random access notified by the base station for the terminal through RRC broadcast or unicast signaling, where the RRC broadcast or unicast signaling includes a first random access configuration index configured for an ordinary terminal, and a second random access configuration index configured for an MTC terminal; the terminal sends a preamble sequence to the base station on the first time domain resource indicated by the one first random access configuration index when the terminal is an ordinary terminal; the terminal sends a preamble sequence to the base station on the second time domain resource indicated by the one second random access configuration index when the terminal is an MTC terminal.

In a third specific implementation manner, the terminal preconfigures a second resource configuration table, where the second resource configuration table includes an indication relationship between a random access configuration index of the terminal and a time domain resource; the terminal receives a parameter for performing the random access notified by the base station for the terminal through RRC broadcast or unicast signaling, where the RRC broadcast or unicast signaling includes a random access configuration index configured for the terminal; the terminal sends a preamble sequence to the base station on the time domain resource indicated by the one random access configuration index when the terminal is an ordinary terminal; the terminal offsets the time domain resource indicated by the one random access configuration index according to a designated time domain resource offset value, and sends a preamble sequence to the base station on an offset time domain resource when the terminal is an MTC terminal, where the designated time domain resource offset value is a time domain resource offset value received by the terminal and notified by the base station through the RRC broadcast or unicast signaling, or a preconfigured time domain resource offset value.

In a fourth specific implementation manner, the terminal receives a parameter for performing the random access notified by the base station for the terminal through RRC broadcast or unicast signaling, where the RRC broadcast or unicast signaling includes indication information of a first frequency domain resource configured for an ordinary terminal, and indication information of a second frequency domain resource configured for an MTC terminal; and sends a preamble sequence to the base station on the first frequency domain resource when the terminal is an ordinary terminal, and sends a preamble sequence to the base station on the second frequency domain resource when the terminal is an MTC terminal, where the first frequency domain resource and the second frequency domain resource are different frequency domain resources.

The notifying the terminal of a parameter for performing the random access through RRC broadcast or unicast signaling may include: receiving a first physical random access channel frequency offset prach-Frequencyoffset configured for an ordinary terminal and used as indication information of the first frequency domain resource, and a second physical random access channel frequency offset prach-Frequencyoffset configured for an MTC terminal and used as indication information of the second frequency domain resource, where the first physical random access channel frequency offset prach-Frequencyoffset and the second physical random access channel frequency offset prach-Frequencyoffset are notified by the base station in the RRC broadcast or unicast signaling; and/or receiving a first random access configuration index configured for an ordinary terminal and used as indication information of the first frequency domain resource, and a second random access configuration index configured for an MTC terminal and used as indication information of the second frequency domain resource, where the first random access configuration index and the second random access configuration index are notified by the base station in the RRC broadcast or unicast signaling; and/or receiving a same random access configuration index configured for an ordinary terminal and an MTC terminal and used as indication information of the first frequency domain resource and indication information of the second frequency domain resource, where the same random access configuration index is notified by the base station in the RRC broadcast or unicast signaling, and is used to indicate the first frequency domain resource and the second frequency domain resource for the ordinary terminal and the MTC terminal respectively.

In a fifth specific implementation manner, the terminal receives a parameter for performing the random access notified by the base station for the terminal through RRC broadcast or unicast signaling, where the RRC broadcast or unicast signaling includes indication information of a first frequency domain resource configured for the terminal, and the indication information of the first frequency domain resource includes a physical random access channel frequency offset prach-Frequencyoffset and/or a random access configuration index; and sends a preamble sequence to the base station on the first frequency domain resource when the terminal is an ordinary terminal; and offsets the first frequency domain resource according to a designated frequency domain resource offset value, and sends a preamble sequence to the base station on an offset frequency domain resource when the terminal is an MTC terminal, where the designated frequency domain resource offset value is a frequency domain resource offset value received by the terminal and notified by the base station through the RRC broadcast or unicast signaling, or a preconfigured frequency domain resource offset value.

In a sixth specific implementation manner, a first preamble sequence is sent to the base station when the terminal is an ordinary terminal, and a second preamble sequence is sent to the base station when the terminal is an MTC terminal, where the first preamble sequence is existing preamble sequences, and the second preamble sequence is several preamble sequences newly defined for the MTC terminal; or, the first preamble sequence is a preamble sequence in the existing preamble sequences except a dedicated sequence, and the second preamble sequence is several preamble sequences into which the dedicated sequence is divided.

Specifically, a manner of generating the newly defined several preamble sequences may include: generating, by adopting a root sequence for generating the 64th preamble sequence in the existing preamble sequences, the newly defined preamble sequences by sequentially increasing a cyclic displacement value of the root sequence; sequentially selecting, when a quantity of the newly defined preamble sequences generated according to the root sequence is less than a preset quantity, root sequences corresponding to logic sequence numbers consecutive with a logic sequence number of the root sequence; and generating the newly defined preamble sequences by performing cyclic displacement on the selected root sequences, until the quantity of the newly defined preamble sequences satisfies the preset quantity; or receiving a logic sequence number of a root sequence of an MTC terminal notified by the base station through RRC broadcast or unicast signaling; sequentially increasing a cyclic displacement value of the root sequence of the MTC terminal to generate the newly defined preamble sequences; sequentially selecting, when a quantity of the newly defined preamble sequences generated according to the root sequence of the MTC terminal is less than a preset quantity, root sequences corresponding to logic sequence numbers consecutive with the logic sequence number of the root sequence of the MTC terminal; and generating the newly defined preamble sequences by performing cyclic displacement on the selected root sequences, until the quantity of the newly defined preamble sequences satisfies the preset quantity; or receiving a logic sequence number of a root sequence of an ordinary terminal notified by the base station through RRC broadcast or unicast signaling; obtaining the root sequence of the MTC terminal according to a designated root sequence offset value and the logic sequence number of the root sequence of the ordinary terminal; sequentially increasing a cyclic displacement value of the root sequence of the MTC terminal to generate the newly defined preamble sequences; sequentially selecting, when a quantity of the newly defined preamble sequences generated according to the root sequence of the MTC terminal is less than a preset quantity, root sequences corresponding to logic sequence numbers consecutive with the logic sequence number of the root sequence of the MTC terminal; and generating the newly defined preamble sequences by performing cyclic displacement on the selected root sequences, until the quantity of the newly defined preamble sequences satisfies the preset quantity, in which, the designated root sequence offset value is a received root sequence offset value notified by the base station through RRC broadcast or unicast signaling, or preconfigured root sequence offset value, where the newly defined preamble sequences and the existing preamble sequences are different preamble sequences.

Specifically, a division manner in which the second preamble sequence is several preamble sequences into which the dedicated sequence is divided may include: receiving the quantity of sequences, serving as the second preamble sequence, in the dedicated sequence and notified by the base station through RRC broadcast or unicast signaling, and obtaining the second preamble sequence according to the sequence quantity and a sequence number of an initial sequence designated as the second preamble sequence, where the sequence number of the designated initial sequence is a received sequence number of an initial sequence notified by the base station through RRC broadcast or unicast signaling, or a sequence number of a preconfigured initial sequence, or a sequence number of an initial sequence obtained according to the sequence quantity.

Step 502: Receive a message of a random access procedure that the base station, after identifying the type of the terminal according to the preamble sequence, sends to the terminal on processing bandwidth supported by the terminal.

Optionally, the message in the random access procedure may include a random access response message and a competition solution message.

It should be noted that, the random access procedure described at the terminal side of the foregoing embodiment is consistent with the random access procedure described at the base station side of the foregoing FIG. 1 to FIG. 4, and is not described anymore here.

It can be seen from the foregoing embodiment that, the base station can distinguish an MTC terminal and an ordinary terminal in a random access procedure, so influence of the MTC terminal on the ordinary terminal in the random access procedure is reduced, collision between the MTC terminal and the ordinary terminal which send a preamble sequence on a same time frequency resource is avoided, competition between the MTC terminal and the ordinary terminal in the random access procedure is alleviated, and the random access quality of the ordinary terminal is improved. Additionally, after the terminal sends a preamble sequence to the base station, the base station can know the type of the terminal, so for an MTC terminal, a message which the MTC terminal can process can be sent on small bandwidth, and for an ordinary terminal, a message which the ordinary terminal can process can be sent on a full frequency band, thereby ensuring that the reception performance of the ordinary terminal is not affected by the MTC terminal.

Corresponding to the embodiments of the random access method according to the present invention, the present invention further provides embodiments of a base station and a terminal.

Figure 6:
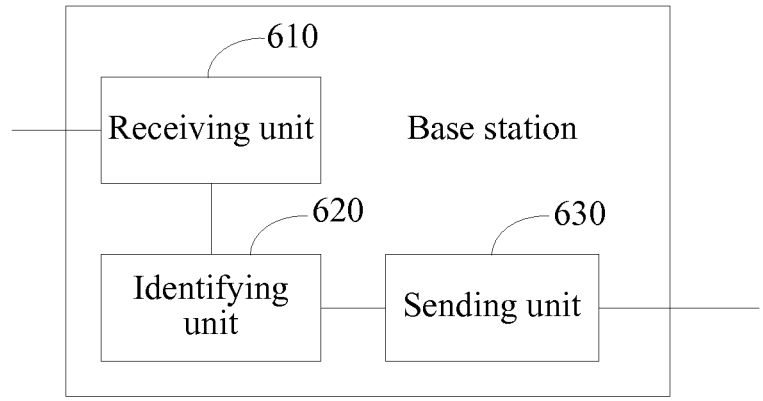
FIG. 6 is a block diagram of an embodiment of a base station according to the present invention.

Referring to FIG. 6, FIG. 6 is a block diagram of an embodiment of a base station according to the present invention.

The base station includes: a receiving unit 610, an identifying unit 620 and a sending unit 630.

The receiving unit 610 is configured to receive a preamble sequence that is sent by a terminal during random access.

The identifying unit 620 is configured to identify a type of the terminal according to the preamble sequence received by the receiving unit.

The sending unit 630 is configured to send, according to the type of the terminal identified by the identifying unit, a message of a random access procedure to the terminal on processing bandwidth supported by the terminal.

The identifying unit may include at least one of the following units: a first identifying subunit, configured to identify the type of the terminal according to a time domain resource for sending the preamble sequence; a second identifying subunit, configured to identify the type of the terminal according to a frequency domain resource for sending the preamble sequence; and a third identifying subunit, configured to identify the type of the terminal according to a type of the preamble sequence.

In a specific embodiment, the base station can further include: a first configuration unit, configured to preconfigure a first random access resource configuration table, where the first random access resource configuration table includes an indication relationship between a random access configuration index and a first time domain resource as well as a second time domain resource; and configure a first time domain resource and a second time domain resource different from the first time domain resource for an ordinary terminal and an MTC terminal, respectively, by using a same random access configuration index; and a first notifying unit, configured to notify a parameter for performing the random access for the terminal through RRC broadcast or unicast signaling, where the RRC broadcast or unicast signaling includes a random access configuration index configured for the terminal; and the first identifying subunit is specifically configured to determine, when the preamble sequence sent by the terminal is detected on the first time domain resource indicated by the one random access configuration index, the terminal is an ordinary terminal, and determine, when the preamble sequence sent by the terminal is detected on the second time domain resource indicated by the one random access configuration index, the terminal is an MTC terminal.

In another specific embodiment, the base station can further include: a second configuration unit, configured to preconfigure an ordinary terminal resource configuration table and an MTC terminal resource configuration table, where the ordinary terminal resource configuration table includes an indication relationship between a first random access configuration index and a first time domain resource, and the MTC terminal resource configuration table includes an indication relationship between a second random access configuration index and a second time domain resource; and a second notifying unit, configured to notify a parameter for performing the random access for the terminal through RRC broadcast or unicast signaling, where the RRC broadcast or unicast signaling includes a first random access configuration index configured for an ordinary terminal, and a second random access configuration index configured for an MTC terminal; and the first identifying subunit is specifically configured to determine, when the preamble sequence sent by the terminal is detected on the first time domain resource indicated by the one first random access configuration index, that the terminal is an ordinary terminal, and determine, when the preamble sequence sent by the terminal is detected on the second time domain resource indicated by the one second random access configuration index, the terminal is an MTC terminal.

In another specific embodiment, the base station can further include: a third configuration unit, configured to preconfigure a second resource configuration table, where the second resource configuration table includes an indication relationship between a random access configuration index of the terminal and a time domain resource; and a third notifying unit, configured to notify a parameter for performing the random access for the terminal through RRC broadcast or unicast signaling, where the RRC broadcast or unicast signaling includes a random access configuration index configured for the terminal; and the first identifying subunit is specifically configured to determine, when the preamble sequence sent by the terminal is detected on the time domain resource indicated by the one random access configuration index, the terminal is an ordinary terminal, and determine, when the preamble sequence sent by the terminal is detected on a time domain resource obtained after the time domain resource indicated by the one random access configuration index is offset according to a designated time domain resource offset value, the terminal is an MTC terminal, where the designated time domain resource offset value is a time domain resource offset value notified through the RRC broadcast or unicast signaling, or a preconfigured time domain resource offset value.

In another specific embodiment, the base station can further include: a fourth notifying unit, configured to notify a parameter for performing the random access for the terminal through RRC broadcast or unicast signaling, where the RRC broadcast or unicast signaling includes indication information of a first frequency domain resource configured for an ordinary terminal, and indication information of a second frequency domain resource configured for an MTC terminal; and the second identifying subunit is specifically configured to determine, when that the terminal sends a preamble sequence on the first frequency domain resource is detected, that the terminal is an ordinary terminal, and determining, when that the terminal sends a preamble sequence on the second frequency domain resource is detected, that the terminal is an MTC terminal, where the first frequency domain resource and the second frequency domain resource are different frequency domain resources.

Specifically, the fourth notifying unit may include at least one of the following units: a first frequency domain resource notifying subunit, configured to notify, in the RRC broadcast or unicast signaling, a first physical random access channel frequency offset prach-Frequencyoffset configured for an ordinary terminal and used as indication information of the first frequency domain resource, and a second physical random access channel frequency offset prach-Frequencyoffset configured for an MTC terminal and used as indication information of the second frequency domain resource; a second frequency domain resource notifying subunit, configured to notify, in the RRC broadcast or unicast signaling, a first random access configuration index configured for an ordinary terminal and used as indication information of the first frequency domain resource, and a second random access configuration index configured for an MTC terminal and used as indication information of the second frequency domain resource; and a third frequency domain resource notifying subunit, configured to notify, in the RRC broadcast or unicast signaling, a same random access configuration index configured for an ordinary terminal and an MTC terminal and used as indication information of the first frequency domain resource and indication information of the second frequency domain resource, where the same random access configuration index is used to indicate the first frequency domain resource and the second frequency domain resource for the ordinary terminal and the MTC terminal respectively.

In another specific embodiment, the base station can further include: a fifth notifying unit, configured to notify a parameter for performing the random access for the terminal through RRC broadcast or unicast signaling, where the RRC broadcast or unicast signaling includes indication information of a first frequency domain resource configured for the terminal, and the indication information of the first frequency domain resource includes a physical random access channel frequency offset prach-Frequencyoffset and/or a random access configuration index; and the second identifying subunit is specifically configured to determine, when that the terminal sends a preamble sequence on the first frequency domain resource is detected, that the terminal is an ordinary terminal, and determine, when that a frequency domain resource on which the terminal sends the preamble sequence is a frequency domain resource obtained after the first frequency domain resource is offset according to a designated frequency domain resource offset value is detected, the terminal is an MTC terminal, where the designated frequency domain resource offset value is a frequency domain resource offset value notified through the RRC broadcast or unicast signaling, or a preconfigured frequency domain resource offset value.

In another specific embodiment, the third identifying subunit is specifically configured to determine, when a first preamble sequence sent by the terminal is received, that the terminal is an ordinary terminal, and determine, when a second preamble sequence sent by the terminal is received, that the terminal is an MTC terminal, where the first preamble sequence is existing preamble sequences, and the second preamble sequence is several preamble sequences newly defined for the MTC terminal; or, the first preamble sequence is a preamble sequence in the existing preamble sequences except a dedicated sequence, and the second preamble sequence is several preamble sequences into which the dedicated sequence is divided.

Specifically, a manner of generating the newly defined several preamble sequences may include: generating, by adopting a root sequence for generating the 64th preamble sequence in the existing preamble sequences, the newly defined preamble sequences by sequentially increasing a cyclic displacement value of the root sequence; sequentially selecting, when a quantity of the newly defined preamble sequences generated according to the root sequence is less than a preset quantity, root sequences corresponding to logic sequence numbers consecutive with a logic sequence number of the root sequence; and generating the newly defined preamble sequences by performing cyclic displacement on the selected root sequences, until the quantity of the newly defined preamble sequences satisfies the preset quantity; or notifying a logic sequence number of a root sequence of an MTC terminal through RRC broadcast or unicast signaling; sequentially increasing a cyclic displacement value of the root sequence of the MTC terminal to generate the newly defined preamble sequences; sequentially selecting, when a quantity of the newly defined preamble sequences generated according to the root sequence of the MTC terminal is less than a preset quantity, root sequences corresponding to logic sequence numbers consecutive with the logic sequence number of the root sequence of the MTC terminal; and generating the newly defined preamble sequences by performing cyclic displacement on the selected root sequences, until the quantity of the newly defined preamble sequences satisfies the preset quantity; or notifying a logic sequence number of a root sequence of an ordinary terminal through RRC broadcast or unicast signaling; obtaining the root sequence of the MTC terminal according to a designated root sequence offset value and the logic sequence number of the root sequence of the ordinary terminal; sequentially increasing a cyclic displacement value of the root sequence of the MTC terminal to generate the newly defined preamble sequences; sequentially selecting, when a quantity of the newly defined preamble sequences generated according to the root sequence of the MTC terminal is less than a preset quantity, root sequences corresponding to logic sequence numbers consecutive with the logic sequence number of the root sequence of the MTC terminal; and generating the newly defined preamble sequences by performing cyclic displacement on the selected root sequences, until the quantity of the newly defined preamble sequences satisfies the preset quantity, in which, the designated root sequence offset value is a root sequence offset value notified through RRC broadcast or unicast signaling, or preconfigured root sequence offset value, where the newly defined preamble sequences and the existing preamble sequences are different preamble sequences.

Specifically, a division manner in which the second preamble sequence is several preamble sequences into which the dedicated sequence is divided may include: notifying the quantity of sequences, serving as the second preamble sequence, in the dedicated sequence through RRC broadcast or unicast signaling, and obtaining the second preamble sequence according to the sequence quantity and a sequence number of an initial sequence designated as the second preamble sequence, where the sequence number of the designated initial sequence is a sequence number of an initial sequence notified through RRC broadcast or unicast signaling, or a sequence number of a preconfigured initial sequence, or a sequence number of an initial sequence obtained according to the sequence quantity.

Optionally, the message in the random access procedure may include: a random access response message and a competition solution message; the sending unit is specifically configured to send, when the terminal is an MTC terminal, a random access response message and a competition solution message to the terminal on first bandwidth supported by the MTC terminal, and send, when the terminal is an ordinary terminal, a random access response message and a competition solution message to the terminal on second bandwidth supported by the ordinary terminal, where the first bandwidth is less than the second bandwidth.

Figure 7:
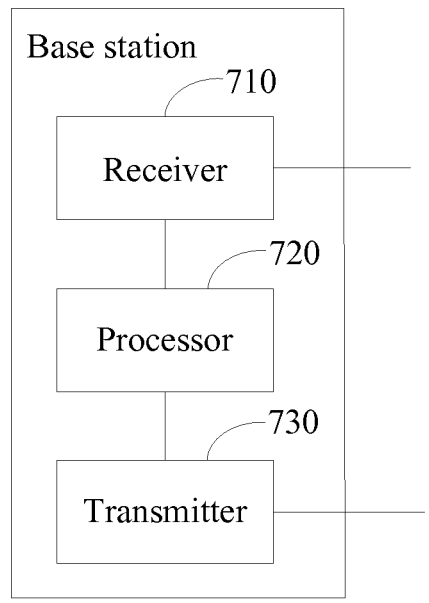
FIG. 7 is a block diagram of another embodiment of a base station according to the present invention.

FIG. 7 is a block diagram of another embodiment of a base station according to the present invention.

The base station includes a receiver 710, a processor 720 and a transmitter 730.

The receiver 710 is configured to receive a preamble sequence that is sent by a terminal during random access.

The processor 720 is configured to identify a type of the terminal according to the preamble sequence.

The transmitter 730 is configured to send, according to the type of the terminal, a message of a random access procedure to the terminal on processing bandwidth supported by the terminal.

The processor 720 can be specifically configured to identify the type of the terminal according to a time domain resource for sending the preamble sequence, and/or identify the type of the terminal according to a frequency domain resource for sending the preamble sequence, and/or identify the type of the terminal according to a type of the preamble sequence.

The transmitter 730 can be specifically configured to send, when the terminal is an MTC terminal, a random access response message and a competition solution message to the terminal on first bandwidth supported by the MTC terminal, and send, when the terminal is an ordinary terminal, a random access response message and a competition solution message to the terminal on second bandwidth supported by the ordinary terminal, where the first bandwidth is less than the second bandwidth.

Figure 8:
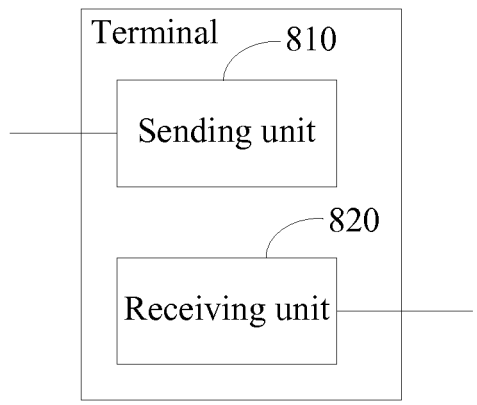
FIG. 8 is a block diagram of an embodiment of a terminal according to the present invention.

Referring to FIG. 8, FIG. 8 is a block diagram of an embodiment of a terminal according to the present invention.

The terminal includes a sending unit 810 and a receiving unit 820.

The sending unit 810 is, configured to send, by the terminal, a preamble sequence to a base station according to a type of the terminal during random access.

The receiving unit 820 is configured to receive, after the base station identifies the type of the terminal according to the preamble sequence sent by the sending unit, a message of a random access procedure sent to the terminal on processing bandwidth supported by the terminal.

The sending unit may include at least one of the following units: a first sending subunit, configured to send a preamble sequence to the base station on a time domain resource corresponding to the type of the terminal; a second sending subunit, configured to send a preamble sequence to the base station on a frequency domain resource corresponding to the type of the terminal; and a third sending subunit, configured to send a preamble sequence corresponding to the type of the terminal to the base station.

In a specific embodiment, the terminal can further include: a first configuration unit, configured to preconfigure a first random access resource configuration table, where the first random access resource configuration table includes an indication relationship between a random access configuration index and a first time domain resource as well as a second time domain resource; and configure a first time domain resource and a second time domain resource different from the first time domain resource for an ordinary terminal and an MTC terminal, respectively, by using a same random access configuration index; and the receiving unit is further configured to receive a parameter for performing the random access notified by the base station for the terminal through RRC broadcast or unicast signaling, where the RRC broadcast or unicast signaling includes a random access configuration index configured for the terminal; and the first sending subunit is specifically configured to send, by the terminal, a preamble sequence to the base station on the first time domain resource indicated by the one random access configuration index when the terminal is an ordinary terminal; and send, by the terminal, a preamble sequence to the base station on the second time domain resource indicated by the one random access configuration index when the terminal is an MTC terminal.

In another specific embodiment, the terminal can further include: a second configuration unit, configured to preconfigure, by the terminal, an ordinary terminal resource configuration table when the terminal is an ordinary terminal, and preconfigure, by the terminal, an MTC terminal resource configuration table when the terminal is an MTC terminal, where the ordinary terminal resource configuration table includes an indication relationship between a first random access configuration index and a first time domain resource, and the MTC terminal resource configuration table includes an indication relationship between a second random access configuration index and a second time domain resource; and the receiving unit is further configured to receive a parameter for performing random access notified by the base station for the terminal through RRC broadcast or unicast signaling, where the RRC broadcast or unicast signaling includes a first random access configuration index configured for an ordinary terminal, and a second random access configuration index configured for an MTC terminal. The first sending subunit is specifically configured to send, by the terminal, a preamble sequence to the base station on the first time domain resource indicated by the one first random access configuration index when the terminal is an ordinary terminal; and send, by the terminal, a preamble sequence to the base station on the second time domain resource indicated by the one second random access configuration index when the terminal is an MTC terminal.

In another specific embodiment, the terminal can further include: a third configuration unit, configured to preconfigure a second resource configuration table, where the second resource configuration table includes an indication relationship between a random access configuration index of the terminal and a time domain resource; and the receiving unit is further configured to receive a parameter for performing the random access notified by the base station for the terminal through RRC broadcast or unicast signaling, where the RRC broadcast or unicast signaling includes a random access configuration index configured for the terminal; and the first sending subunit is specifically configured to send, by the terminal, a preamble sequence to the base station on the time domain resource indicated by the one random access configuration index when the terminal is an ordinary terminal; and offset, by the terminal, the time domain resource indicated by the one random access configuration index according to a designated time domain resource offset value, and send a preamble sequence to the base station on an offset time domain resource when the terminal is an MTC terminal, where the designated time domain resource offset value is a time domain resource offset value received by the terminal and notified by the base station through the RRC broadcast or unicast signaling, or a preconfigured time domain resource offset value.

In another specific embodiment, the receiving unit is further configured to receive a parameter for performing the random access notified by the base station for the terminal through RRC broadcast or unicast signaling, where the RRC broadcast or unicast signaling includes indication information of a first frequency domain resource configured for an ordinary terminal, and indication information of a second frequency domain resource configured for an MTC terminal; and specifically, the receiving, by the terminal, a parameter for performing the random access notified by the base station for the terminal through RRC broadcast or unicast signaling may include: receiving a first physical random access channel frequency offset prach-Frequencyoffset configured for an ordinary terminal and used as indication information of the first frequency domain resource, and a second physical random access channel frequency offset prach-Frequencyoffset configured for an MTC terminal and used as indication information of the second frequency domain resource, where the first physical random access channel frequency offset prach-Frequencyoffset and the second physical random access channel frequency offset prach-Frequencyoffset are notified by the base station in the RRC broadcast or unicast signaling; and/or receiving a first random access configuration index configured for an ordinary terminal and used as indication information of the first frequency domain resource, and a second random access configuration index configured for an MTC terminal and used as indication information of the second frequency domain resource, where the first random access configuration index and the second random access configuration index are notified by the base station in the RRC broadcast or unicast signaling; and/or receiving a same random access configuration index configured for an ordinary terminal and an MTC terminal and used as indication information of the first frequency domain resource and indication information of the second frequency domain resource, where the same random access configuration index is notified by the base station in the RRC broadcast or unicast signaling, and is used to indicate the first frequency domain resource and the second frequency domain resource for the ordinary terminal and the MTC terminal respectively.

The second sending subunit is specifically configured to send a preamble sequence to the base station on the first frequency domain resource when the terminal is an ordinary terminal, and send a preamble sequence to the base station on the second frequency domain resource when the terminal is an MTC terminal, where the first frequency domain resource and the second frequency domain resource are different frequency domain resources.

In another specific embodiment, the receiving unit is further configured to receive a parameter for performing the random access notified by the base station for the terminal through RRC broadcast or unicast signaling, where the RRC broadcast or unicast signaling includes indication information of a first frequency domain resource configured for the terminal, and the indication information of the first frequency domain resource includes a physical random access channel frequency offset prach-Frequencyoffset and/or a random access configuration index; and the second sending subunit is specifically configured to send a preamble sequence to the base station on the first frequency domain resource when the terminal is an ordinary terminal; and offset the first frequency domain resource according to a designated frequency domain resource offset value, and send a preamble sequence to the base station on an offset frequency domain resource when the terminal is an MTC terminal, where the designated frequency domain resource offset value is a frequency domain resource offset value received by the terminal and notified by the base station through the RRC broadcast or unicast signaling, or a preconfigured frequency domain resource offset value.

In another specific embodiment, the third sending subunit is specifically configured to send a first preamble sequence to the base station when the terminal is an ordinary terminal, and send a second preamble sequence to the base station when the terminal is an MTC terminal, where the first preamble sequence is existing preamble sequences, and the second preamble sequence is several preamble sequences newly defined for the MTC terminal; or, the first preamble sequence is a preamble sequence in the existing preamble sequences except a dedicated sequence, and the second preamble sequence is several preamble sequences into which the dedicated sequence is divided.

Specifically, a manner of generating the newly defined several preamble sequences may include: generating, by adopting a root sequence for generating the 64th preamble sequence in the existing preamble sequences, the newly defined preamble sequences by sequentially increasing a cyclic displacement value of the root sequence; sequentially selecting, when a quantity of the newly defined preamble sequences generated according to the root sequence is less than a preset quantity, root sequences corresponding to logic sequence numbers consecutive with a logic sequence number of the root sequence; and generating the newly defined preamble sequences by performing cyclic displacement on the selected root sequences, until the quantity of the newly defined preamble sequences satisfies the preset quantity; or receiving a logic sequence number of a root sequence of an MTC terminal notified by the base station through RRC broadcast or unicast signaling; sequentially increasing a cyclic displacement value of the root sequence of the MTC terminal to generate the newly defined preamble sequences; sequentially selecting, when a quantity of the newly defined preamble sequences generated according to the root sequence of the MTC terminal is less than a preset quantity, root sequences corresponding to logic sequence numbers consecutive with the logic sequence number of the root sequence of the MTC terminal; and generating the newly defined preamble sequences by performing cyclic displacement on the selected root sequences, until the quantity of the newly defined preamble sequences satisfies the preset quantity; or receiving a logic sequence number of a root sequence of an ordinary terminal notified by the base station through RRC broadcast or unicast signaling; obtaining the root sequence of the MTC terminal according to a designated root sequence offset value and the logic sequence number of the root sequence of the ordinary terminal; sequentially increasing a cyclic displacement value of the root sequence of the MTC terminal to generate the newly defined preamble sequences; sequentially selecting, when a quantity of the newly defined preamble sequences generated according to the root sequence of the MTC terminal is less than a preset quantity, root sequences corresponding to logic sequence numbers consecutive with the logic sequence number of the root sequence of the MTC terminal; and generating the newly defined preamble sequences by performing cyclic displacement on the selected root sequences, until the quantity of the newly defined preamble sequences satisfies the preset quantity, in which, the designated root sequence offset value is a received root sequence offset value notified by the base station through RRC broadcast or unicast signaling, or preconfigured root sequence offset value, where the newly defined preamble sequences and the existing preamble sequences are different preamble sequences.

Specifically, a division manner in which the second preamble sequence is several preamble sequences into which the dedicated sequence is divided may include: receiving the quantity of sequences, serving as the second preamble sequence, in the dedicated sequence and notified by the base station through RRC broadcast or unicast signaling, and obtaining the second preamble sequence according to the sequence quantity and a sequence number of an initial sequence designated as the second preamble sequence, where the sequence number of the designated initial sequence is a received sequence number of an initial sequence notified by the base station through RRC broadcast or unicast signaling, or a sequence number of a preconfigured initial sequence, or a sequence number of an initial sequence obtained according to the sequence quantity.

Figure 9:
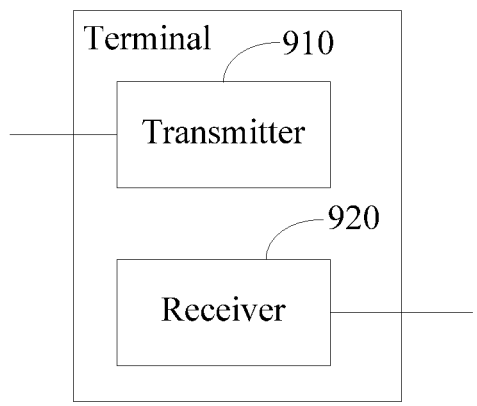
FIG. 9 is a block diagram of another embodiment of a terminal according to the present invention.

Referring to FIG. 9, FIG. 9 is a block diagram of another embodiment of a terminal according to the present invention.

The terminal includes a transmitter 910 and a receiver 920.

The transmitter 910 is configured to send, by the terminal, a preamble sequence to a base station according to a type of the terminal during random access.

The receiver 920 is configured to receive a message of a random access procedure that the base station, after identifying the type of the terminal according to the preamble sequence, sends to the terminal on processing bandwidth supported by the terminal.

The transmitter can be specifically configured to send a preamble sequence to the base station on a time domain resource corresponding to the type of the terminal, and/or send a preamble sequence to the base station on a frequency domain resource corresponding to the type of the terminal, and/or send a preamble sequence corresponding to the type of the terminal to the base station.

It can be seen from the foregoing embodiment that, a base station receives a preamble sequence that is sent by a terminal during random access, identifies a type of the terminal according to the preamble sequence, and sends, according to the type of the terminal, a message of a random access procedure to the terminal on processing bandwidth supported by the terminal. In the embodiments of the present invention, an MTC terminal and an ordinary terminal can be distinguished in a random access procedure, influence of the MTC terminal on the ordinary terminal in the random access procedure is reduced, collision between the MTC terminal and the ordinary terminal which send a preamble sequence on a same time frequency resource is avoided, competition between the MTC terminal and the ordinary terminal in the random access procedure is alleviated, and the random access quality of the ordinary terminal is improved. Additionally, after the terminal sends a preamble sequence to the base station, the base station can know the type of the terminal, so for an MTC terminal, a message which the MTC terminal can process can be sent on small bandwidth, and for an ordinary terminal, a message which the ordinary terminal can process can be sent on a full frequency band, thereby ensuring that the reception performance of the ordinary terminal is not affected by the MTC terminal.

Persons skilled in the art may clearly understand that technologies in the embodiments of the present invention may be implemented by means of software and a necessary general hardware platform. Based on such understanding, the technical solutions in the embodiments of the present invention or the part that makes contributions to the prior art can be substantially embodied in the form of a software product. The computer software product may be stored in a storage medium such as a ROM/RAM, a magnetic disk, or an optical disk, and contain several instructions to instruct a computer device (for example, a personal computer, a server, or a network device) to perform the methods described in the embodiments of the present invention or in some parts of the embodiments of the present invention.

The embodiments of the specification are described in a progressive manner, reference may be made between the same and similar parts of the embodiments, and what is emphasized in the description of each embodiment focuses on the part different from another part of other embodiments. Especially, for the system embodiment, since the system embodiment is basically similar to the method embodiment, the description is simple; for related parts, reference may be made to related description of the method embodiment.

The foregoing implementation manners of the present invention do not constitute a limit to the protection scope of the present invention. Any modification, equivalent replacement, and improvement made within the spirit and principle of the present invention should all fall within the protection scope of the present invention.

What is claimed is:

1. A random access method, comprising:
preconfiguring a first random access resource configuration table, wherein the first random access resource configuration table comprises an indication relationship between a random access configuration index and a first time domain resource and a second time domain resource:
configuring a first time domain resource and a second time domain resource different from the first time domain resource for an ordinary terminal and an MTC terminal, respectively, using a same random access configuration index: and
notifying a terminal of a parameter for performing a random access procedure through RRC broadcast or unicast signaling, wherein the RRC broadcast or unicast signaling comprises a random access configuration index configured for the terminal:
receiving, by a base station, a preamble sequence that is sent by the terminal during random access;
identifying, according to the preamble sequence, whether the terminal is an ordinary terminal or a machine type communication (MTC) terminal, wherein identifying whether the terminal is an ordinary terminal or a MTC terminal comprises determining that the terminal is an ordinary terminal when the preamble sequence sent by the terminal is detected on the first time domain resource indicated by the random access configuration index, and determining that the terminal is an MTC terminal when the preamble sequence sent by the terminal is detected on the second time domain resource indicated by the random access configuration index: and
sending, according to the identification of whether the terminal is an ordinary terminal or a MTC terminal, a message of a random access procedure to the terminal on processing bandwidth supported by the terminal.

2. The random access method according to claim 1, wherein the preamble sequence that is sent by a terminal during random access is borne through a physical random access channel.

3. The random access method according to claim 1, wherein the preamble sequence is formed of a sequence duration and a cyclic prefix.

4. A random access method, comprising:
receiving, by a terminal, a parameter for performing random access notified by a base station for the terminal through RRC broadcast or unicast signaling, wherein the RRC broadcast or unicast signaling comprises indication information of a first frequency domain resource configured for the terminal, and the indication information of the first frequency domain resource comprises a physical random access channel frequency offset (prach-Frequencyoffset) and/or a random access configuration index;
sending, by the terminal, a preamble sequence to the base station during random access, the preamble sequence being sent to the base station on a frequency domain resource that is selected by the terminal according to whether the terminal is an ordinary terminal or a machine type communication (MTC) terminal; and
receiving a message of a random access procedure that the base station sends to the terminal after identifying whether the terminal is an ordinary terminal or a MTC terminal according to the preamble sequence, the message received on processing bandwidth supported by the terminal;
wherein sending the preamble sequence to the base station on a frequency domain resource corresponding to the type of the terminal comprises sending a preamble sequence to the base station on the first frequency domain resource when the terminal is an ordinary terminal; and offsetting the first frequency domain resource according to a designated frequency domain resource offset value, and sending a preamble sequence to the base station on an offset frequency domain resource when the terminal is an MTC terminal.

5. The method according to claim 4, wherein receiving the parameter for performing the random access comprises:
receiving a first physical random access channel frequency offset (prach-Frequencyoffset) configured for an ordinary terminal and used as indication information of the first frequency domain resource, and a second physical random access channel frequency offset (prach-Frequencyoffset) configured for an MTC terminal and used as indication information of the second frequency domain resource, wherein the first physical random access channel frequency offset (prach-Frequencyoffset) and the second physical random access channel frequency offset (prach-Frequencyoffset) are notified by the base station in the RRC broadcast or unicast signaling.

6. The method according to claim 4, wherein receiving the parameter for performing the random access comprises:
receiving a first random access configuration index configured for an ordinary terminal and used as indication information of the first frequency domain resource, and a second random access configuration index configured for an MTC terminal and used as indication information of the second frequency domain resource, wherein the first random access configuration index and the second random access configuration index are notified by the base station in the RRC broadcast or unicast signaling.

7. The method according to claim 4, wherein receiving the parameter for performing the random access comprises:
receiving a same random access configuration index configured for an ordinary terminal and an MTC terminal and used as indication information of the first frequency domain resource and indication information of a second frequency domain resource, wherein the same random access configuration index is notified by the base station in the RRC broadcast or unicast signaling, and is used to indicate the first frequency domain resource and the second frequency domain resource for the ordinary terminal and the MTC terminal respectively.

8. A base station, comprising:
a receiver, configured to receive a preamble sequence that is sent by a terminal during random access;
a processor, configured to:
preconfigure an ordinary terminal resource configuration table and an MTC terminal resource configuration table, wherein the ordinary terminal resource configuration table comprises an indication relationship between a first random access configuration index and a first time domain resource, and the MTC terminal resource configuration table comprises an indication relationship between a second random access configuration index and a second time domain resource;
notify the terminal of a parameter for performing the random access through RRC broadcast or unicast signaling, wherein the RRC broadcast or unicast signaling comprises a first random access configuration index configured for an ordinary terminal, and a second random access configuration index configured for an MTC terminal;

identify a type of the terminal according to a time domain resource on which the preamble sequence is received, wherein identifying the type of the terminal comprises determining, when the preamble sequence sent by the terminal is detected on the first time domain resource indicated by the first random access configuration index, that the terminal is an ordinary terminal, and determining, when the preamble sequence sent by the terminal is detected on the second time domain resource indicated by the second random access configuration index, that the terminal is an MTC terminal; and a transmitter, configured to send, according to the type of the terminal, a message of a random access procedure to the terminal on processing bandwidth supported by the terminal.

9. The base station according to claim 8, wherein the receiver is configured to receive the preamble sequence that is borne through a physical random access channel.

10. The base station according to claim 8, wherein the preamble sequence is formed of a sequence duration and a cyclic prefix.

* * * * *